US 008034866B2

(12) United States Patent
Zhu et al.

(10) Patent No.: US 8,034,866 B2
(45) Date of Patent: Oct. 11, 2011

(54) POLYMER COMPOSITIONS, METHOD OF MANUFACTURE, AND ARTICLES FORMED THEREFROM

(75) Inventors: Yantao Zhu, Evansville, IN (US); Bernard Schrauwen, Sterksel (NL); Jos van Gisbergen, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 522 days.

(21) Appl. No.: 12/116,534

(22) Filed: May 7, 2008

(65) Prior Publication Data

US 2008/0242789 A1 Oct. 2, 2008

Related U.S. Application Data

(63) Continuation-in-part of application No. 11/020,835, filed on Dec. 23, 2004, now Pat. No. 7,557,154, which is a continuation-in-part of application No. 10/748,393, filed on Dec. 30, 2003, now abandoned.

(51) Int. Cl.
*C08K 3/30* (2006.01)
(52) U.S. Cl. ........ 524/423; 524/502; 524/449; 524/451; 524/447; 524/431
(58) Field of Classification Search .................. 524/423, 524/502, 449, 451, 447, 431
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,096,156 A | 6/1978 | Freudenberger et al. | |
| 4,154,775 A | 5/1979 | Axelrod | |
| 4,217,438 A | 8/1980 | Brunelle et al. | |
| 4,579,906 A | 4/1986 | Zabrocki et al. | |
| 4,647,602 A | 3/1987 | Wilczak et al. | |
| 4,746,701 A | 5/1988 | Kress et al. | |
| 4,810,739 A | 3/1989 | Lindner et al. | |
| 5,030,675 A | 7/1991 | Wittmann | |
| 5,091,461 A | 2/1992 | Skochdopole | |
| 5,484,875 A | 1/1996 | Sakashita et al. | |
| 5,804,654 A | 9/1998 | Lo et al. | |
| 5,879,791 A | 3/1999 | Kato et al. | |
| 5,900,446 A | 5/1999 | Nishihara et al. | |
| 5,962,587 A | 10/1999 | Gaggar et al. | |
| 6,025,441 A | 2/2000 | Koshirai et al. | |
| 6,117,542 A | 9/2000 | Nanba et al. | |
| 6,127,465 A | 10/2000 | Nodera | |
| 6,506,871 B1 | 1/2003 | Silvi et al. | |
| 6,518,315 B1 | 2/2003 | Roufogalis et al. | |
| 6,737,465 B2 | 5/2004 | Seidel et al. | |
| 6,812,320 B2 | 11/2004 | Silva et al. | |
| 7,105,592 B2 | 9/2006 | Warth et al. | |
| 2003/0008964 A1 | 1/2003 | Seidel et al. | |
| 2003/0149223 A1 | 8/2003 | McCloskey et al. | |
| 2005/0143508 A1 | 6/2005 | Tyagi et al. | |
| 2006/0142455 A1 | 6/2006 | Agarwal et al. | |
| 2006/0287422 A1 | 12/2006 | Volkers et al. | |
| 2007/0276069 A1* | 11/2007 | Agarwal et al. | ............... 524/394 |

FOREIGN PATENT DOCUMENTS

| | | |
|---|---|---|
| EP | 0305816 A2 | 3/1989 |
| EP | 0755977 | 1/1997 |
| EP | 0846729 | 6/1998 |
| JP | 11034150 | 2/1999 |
| JP | 11269360 | 10/1999 |
| JP | 2000290486 | 10/2000 |
| WO | 98 44876 | 10/1998 |
| WO | 2007/087346 A3 | 8/2007 |
| WO | 2007/089653 A2 | 8/2007 |

OTHER PUBLICATIONS

ASTM Designation: D 523-89, "Standard Test Method for Specular Gloss," 5 pp. (May 1989).
ASTM Designation: D 790-3, "Standard Test Methods for Flexural Properties of Unreinforced and Reinforced Plastics and Electrical Insulating Materials," 11 pp. (Apr. 2003).
ASTM Designation: E 831-03, "Standard Test Method for Linear Thermal Expansion of Solid Materials by Thermomechanical Analysis," Sep. 2003 (5 pgs).
ASTM Designation: D 256-04, "Standard Test Methods for Determining the Izod Pendulum Impact Resistance of Plastics," Jun. 2004 (20 pgs).
ASTM Designation: D 648-1, "Standard Test Method for Deflection Temperature of Plastics Under Flexural Load in the Edgewise Position," 2001 (12 pgs).
ASTM Designation: D 3763-02, "Standard Test Method for High Speed Puncture Properties of Plastics Using Load and Displacement Sensors," 2006 (10 pgs).
ISO 527-1 "Plastics—Determination of Tensile Properties" Part 1: General Principles First Edition 1993 (12 pgs).
ISO 527-2 "Plastics—Determination of Tensile Properties" Part 2: Test Conditions for Moulding and ExtrusionPlastics First Edition 1993 (8 pgs).
ISO 527-3 "Plastics Determination of Tensile Properties" Part 3: Test Conditions for Films and Sheets First Edition 1995 (10 pgs).
ISO 527-4 "Plastics—Determination of Tensile Properties" Part 4: Test Conditions for Isotropic and Orthotropic Fibre-Reinforced Plastic Composites, First Edition 1997 (16 pgs).
ISO 527-5 "Plastics—Determination of Tensile Properties" Part 5: Test Conditions for Unidirectional Fibre-Reinforced Plastic Composites First Edition 1997 (12 pgs).
ISO 178 "Plastics—Determination of Flexural Properties" Fourth Edition 2001 (20 pgs).

(Continued)

*Primary Examiner* — Robert D. Harlan
(74) *Attorney, Agent, or Firm* — Cantor Colburn LLP; Diderico van Eyl

(57) ABSTRACT

A composition comprises, based on the total weight of the composition, from 10 to 80 wt. % of a polyester; from 10 to 80 wt. % of a polycarbonate; from 0 to 20 wt. % of an impact modifier; from 1 to less than 25 wt. % of a reinforcing filler; from 0.1 to less than 2.5 wt. % of a fibrillated fluoropolymer; from 0 to 5 wt. % of an additive selected from the group consisting of antioxidants, mold release agents, colorants, quenchers, stabilizers, and combinations thereof, wherein the composition has a heat deflection temperature of at least 110° C., measured in accordance with to ASTM D648 on 3.2 mm thick molded bars at 0.455 MPa.

26 Claims, No Drawings

OTHER PUBLICATIONS

ISO 178 "Plastics—Determination of Flexural Properties" Amendment 1: Precision Statement 2004 (8 pgs).

ISO 180 "Plastics—Determination of Izod Impact Strength" Third Edition 2000 (15 pgs).

UL 94 "Test for Flammability of Plastic Materials for Parts in Devices and Appliances" Fifth Edition 1996 (52 pgs).

International Search Report; Internationsl Application No. PCT/US2004/043593; Date Mailed Apr. 18, 2005.

Cooper, et al., "Life Cycle Engineering Guidelines," EPA, 2001 (100 pgs).

ASTM Designation: D 648-1, "Standard Test Method for Deflection Temperature of Plastics Under Flexural Load in the Edgewise Position," 2001 (12 pgs).

ASTM Designation: D 3763-02, "Standard Test Method for High Speed Puncture Properties of Plastics Using Load and Displacement Sensors," 2006 (10 pgs).

ISO 527-1 "Plastics—Determination of Tensile Properties" Part 1: General Principles First Edition 1993 (12 pgs).

ISO 527-2 "Plastics—Determination of Tensile Properties" Part 2: Test Conditions for Moulding and ExtrusionPlastics First Edition 1993 (8 pgs).

ISO 527-3 "Plastics Determination of Tensile Properties" Part 3: Test Conditions for Films and Sheets First Edition 1995 (10 pgs).

ISO 527-4 "Plastics—Determination of Tensile Properties" Part 4: Test Conditions for Isotropic and Orthotropic Fibre-Reinforced Plastic Composites, First Edition 1997 (16 pgs).

ISO 527-5 "Plastics—Determination of Tensile Properties" Part 5: Test Conditions for Unidirectional Fibre-Reinforced Plastic Composites First Edition 1997 (12 pgs).

ISO 178 "Plastics—Determination of Flexural Properties" Fourth Edition 2001 (20 pgs).

ISO 178 "Plastics—Determination of Flexural Properties" Amendment 1: Precision Statement 2004 (7 pgs).

ISO 180 "Plastics—Determination of Izod Impact Strength" Third Edition 2000 (15 pgs).

International Search Report for PCT/US2009/043046, mailed Sep. 30, 2009, 4 pages.

Written Opinion for International Search Report for PCT/US2009/043046, mailed Sep. 30, 2009, 6 pages.

* cited by examiner

POLYMER COMPOSITIONS, METHOD OF MANUFACTURE, AND ARTICLES FORMED THEREFROM

CROSS-REFERENCE TO RELATED APPLICATION

This application is a continuation-in-part of U.S. non-provisional application Ser. No. 11/020,835, filed Dec. 23, 2004, now U.S. Pat. No. 7,557,154 which is a continuation-in-part of U.S. non-provisional application Ser. No. 10/748,393, filed Dec. 30, 2003, now abandoned both of which are incorporated herein by reference in their entirety.

BACKGROUND OF THE INVENTION

This disclosure relates to polymer compositions, methods to synthesize the polymer compositions and articles made from the compositions.

Many polymer-based articles are manufactured by injection or other molding processes. In order to obtain good mechanical properties such as high modulus, different approaches have been tried, such as use of filler to reinforce the polymers. Different types of fillers such as glass fibers, aramid fibers, carbon fibers, and various particulate fillers have been used. However, addition of these fillers often leads to brittle failure of the polymer and may lower the impact strength of the resin. Where improved ductility has been obtained, such as in the case of aramid fillers, the modulus obtained is very low. In addition, use of fillers may present processing difficulties, due at least in part to lack of compatibility of the filler with the polymer matrix. Such incompatibility may also result in molding and flow-related problems.

Despite advances in the art and the success of many filled polymer compositions, there remains a continuing need for improved combinations of properties such as higher modulus, improved ductility, improved impact, and/or improved melt flow characteristics, so that molding operations may be performed more rapidly and with improved economics. Also it is desirable that the article has good impact resistance and ductility without the consequent loss of other desirable characteristics. Typically, it is difficult to obtain high modulus, good flow, and good ductility and impact strength in a particular polymer composition.

Therefore, there remains a continuing need in the art for compositions, methods, and articles that may provide a balanced mechanical property profile, particularly tensile modulus and impact properties.

BRIEF DESCRIPTION OF THE INVENTION

In one embodiment, a composition comprises, based on the total weight of the composition: from 10 to 80 wt. % of a polyester comprising units of the formula

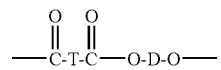

wherein T is a divalent group selected from the group consisting of $C_{5-7}$ cycloaliphatics groups, $C_{6-12}$ aromatic groups, and combinations thereof, and D is a divalent group selected from the group consisting of $C_{6-12}$ cycloaliphatic groups, $C_{2-12}$ aliphatic groups, and combinations thereof, from 10 to 80 wt. % of a polycarbonate; from 0 to 20 wt. % of an impact modifier; from 1 to less than 25 wt. % of a reinforcing filler; from 0.1 to less than 2.5 wt. % of a fibrillated fluoropolymer; from 0 to 5 wt. % of an additive selected from the group consisting of antioxidants, mold release agents, colorants, quenchers, stabilizers, and combinations thereof, wherein the composition has a heat deflection temperature of at least 110° C., measured in accordance with to ASTM D648 on 3.2 mm thick molded bars at 0.455 MPa.

In another embodiment, a composition comprises from 20 to 70 wt. % of a poly(butylene terephthalate); from 15 to 70 wt. % of a polycarbonate comprising carbonate units derived from bisphenol-A; from 3 to 15 wt. % of an impact modifier selected from the group consisting of acrylonitrile butadiene styrene methyl methacrylate-butadiene-styrene impact modifiers, and combinations thereof, from 2 to 20 wt. % of a talc; from 0.2 to 3 wt. % of styrene-acrylonitrile encapsulated poly(tetrafluoroethylene)); and from 0 to 5 wt. % of an additive selected from the group consisting of antioxidants, mold release agents, colorants, quenchers, stabilizers, and combinations thereof.

In still another embodiment, a composition comprises from 20 to 50 wt. % of a polybutylene terephthalate; from 40 to 60 wt. % of a bisphenol-A polycarbonate; from 3 to 15 wt. % of a core-shell methyl methacrylate-butadiene-styrene impact modifier; from 2 to 15 wt. % of a talc having an average particle size of 0.5 to 2 micrometers; from 1 to 2 wt. % of styrene-acrylonitrile encapsulated poly(tetrafluoroethylene); and from 0 to 4 wt. % of an additive composition selected from the group consisting of antioxidants, mold release agents, colorants, quenchers, stabilizers, and combinations hereof.

A method of forming a composition comprises melt blending the components of the composition of claim 1.

A method of making an article comprises melt blending the components of the composition and further comprises shaping by injection molding, extrusion molding, rotation molding, foam molding, calendar molding, blow molding, thermoforming, compaction, or melt spinning the melt blended composition to form the article.

Also disclosed are articles comprising the composition.

Various other features, aspects, and advantages of the present invention will become more apparent with reference to the following description, examples, and appended claims.

DETAILED DESCRIPTION OF THE INVENTION

This invention is based on the discovery that by using specific combinations of a reinforcing filler and a fibrillated fluoropolymer, in conjunction with polyesters and polycarbonates, it is now possible to make a composition that exhibits useful impact properties (e.g., notched Izod and multiaxial impact), and modulus. This is unexpected because ordinarily the increase of modulus is achieved at the expense of the impact properties. Conversely, the impact properties are achieved at the expense of modulus properties. In this specification and in the claims, which follow, reference will be made to a number of terms which shall be defined to have the following meanings.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

"Combination" as used herein includes mixtures, copolymers, reaction products, blends, composites, and the like.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Values expressed as "greater than about" or "less than about" are inclusive the stated endpoint, e.g., "greater than about 3.5" encompasses the value of 3.5.

All ASTM tests and data are from the 1991 edition of the Annual Book of ASTM Standards unless otherwise indicated.

As used herein the term "polycarbonate" refers to polycarbonates incorporating structural units derived from the reaction of one or more dihydroxy aromatic compounds and one or more carbonate precursors, and includes copolymers of polycarbonates such as polyester carbonates.

In one aspect, it has been found that mixed polymer compositions comprising at least one matrix polymer, at least one fibrillated fluoropolymer, and at least one filler have unexpectedly improved properties when the fluoropolymer is fibrillated in situ during the mixing process. In particular, improved mechanical properties such as coefficient of thermal expansion (CTE), ductility, impact strength, and/or tensile modulus may be achieved, compared to compositions produced from a pre-fibrillated fluoropolymer, under conditions where the fluoropolymer is not fibrillated, or where a filler is not present. The fluoropolymer may be at least partially encapsulated by an encapsulating polymer, or used without any encapsulation, i.e., in its neat form. The fibrillated fluoropolymer can be added individually or in a composition containing other materials, such as other polymers.

In a specific embodiment, it has been found that use of defined ranges of particular components (polyester, polycarbonate, impact modifier, reinforcing filler and encapsulated fluoropolymer) unexpectedly provides advantageous heat deflection temperatures in combination with good mechanical properties, specifically a good balance between Notched Izod impact strength and flexural modulus.

In one embodiment, a composition comprises, based on the total weight of the composition: from 10 to 80 wt. % of a polyester comprising units of the formula

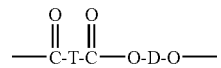

wherein T is a divalent group selected from the group consisting of $C_{5-7}$ cycloaliphatics groups, $C_{6-12}$ aromatic groups, and combinations thereof, and D is a divalent group selected from the group consisting of $C_{6-12}$ cycloaliphatic groups, $C_{2-12}$ aliphatic groups, and combinations thereof, from 10 to 80 wt. % of a polycarbonate; from 0 to 20 wt. % of an impact modifier; from 1 to less than 25 wt. % of a reinforcing filler; from 0.1 to less than 2.5 wt. % of a fibrillated fluoropolymer; from 0 to 5 wt. % of an additive selected from the group consisting of antioxidants, mold release agents, colorants, quenchers, stabilizers, and combinations thereof, wherein the composition has a heat deflection temperature of at least 110° C., measured in accordance with to ASTM D648 on 3.2 mm thick molded bars at 0.455 MPa. In one embodiment, the composition further comprises a second polyester that is different from the polyester.

The matrix polymer component comprises one or more polymers that are not fibrillated during the mixing process described herein. Examples of suitable matrix polymers include, but are not limited to, amorphous, crystalline, and semi-crystalline thermoplastic materials such as polyolefins (for example, linear or cyclic polyolefins such as polyethylene, chlorinated polyethylene, polypropylene, and the like); polyesters (for example, polyethylene terephthalate, polybutylene terephthalate, polycyclohexylmethylene terephthalate, and the like); arylate esters; polyamides; polysulfones (including hydrogenated polysulfones, and the like); polyimides; polyetherimides; polyether sulfones; polyphenylene sulfides; polyether ketones; polyether ether ketones; ABS resins; polystyrenes (for example hydrogenated polystyrenes, syndiotactic and atactic polystyrenes, hydrogenated polystyrenes such as polycyclohexylethylene, styrene-co-acrylonitrile, styrene-co-maleic anhydride, and the like); polybutadiene; polyacrylates (for example, polymethylmethacrylate (PMMA), methyl methacrylate-polyimide copolymers, and the like); polyacrylonitrile; polyacetals; polycarbonates; polyphenylene ethers (for example, those derived from 2,6-dimethylphenol and copolymers with 2,3, 6-trimethylphenol, and the like); ethylene-vinyl acetate copolymers; polyvinyl acetate; liquid crystalline polymers; fluoropolymers such as ethylene-tetrafluoroethylene copolymer, polyvinyl fluoride, and polyvinylidene fluoride, poly (tetrafluoroethylene) (provided that the fluoropolymer has a lower softening temperature than the fluoropolymer component described below); polyvinyl chloride, polyvinylidene chloride; and combinations comprising at least one of the foregoing polymers. The matrix polymer may generally be provided in any form, including but not limited to powders, plates, pellets, flakes, chips, whiskers, and the like.

In one embodiment, the matrix polymer may be a homopolymer or copolymer of a polyolefin, a homopolymer or copolymer of a polycarbonate, a homopolymer or copolymer of a polyester, a homopolymer or copolymer of a polyphenylene ether, a homopolymer or copolymer of a styrenic polymer, or a combination comprising at least one of the foregoing. Specifically, the matrix polymer may comprise a homopolymer or copolymer comprising at least one of polyethylene, polypropylene, or polybutylene. In another embodiment, the matrix polymer may comprise a polycarbonate, or a combination comprising a polycarbonate Useful polycarbonates comprise at least two repeating units of the general formula (I):

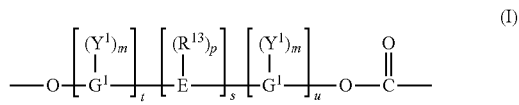

wherein each $G^1$ may be the same or different, and at least 60% of the moieties represented by $G^1$ are aromatic, for example a phenylene, biphenylene, naphthylene, or the like.

E in formula (I) may be a divalent $C_{1-36}$ hydrocarbyl group such as an alkylene, alkylidene, cycloalkylene, or cycloalkylidene group, for example methylene, ethylene, ethylidene, propylene, propylidene, isopropylidene, butylene, butylidene, isobutylidene, amylene, amylidene, isoamylidene, cyclohexylene, and the like. Alternatively, E may be two or more alkylene or alkylidene groups connected by a moiety different from alkylene or alkylidene, such as an aromatic linkage, a tertiary amino linkage, an ether linkage, an ester linkage, a carbonyl linkage, a silicon-containing linkage (for example dimethylsiloxane), a sulfur-containing linkage such as sulfide, sulfoxide, or sulfone, a phosphorus-containing linkage such as phosphinyl, phosphonyl, and like linkages. Alternatively, E may be a tertiary amino linkage (wherein $R^{13}$ is as defined above), an ether linkage, an ester linkage, a carbonyl linkage, a silicon-containing linkage (for example dimethylsiloxane), a sulfur-containing linkage such as sulfide, sulfoxide, or sulfone, a phosphorus-containing linkage such as phosphinyl or phosphonyl, and like linkages.

The letter "p" represents an integer from and including zero through the number of positions on E available for substitution. $R^{13}$, when present, is hydrogen or a monovalent hydrocarbyl group such as a $C_{1-12}$ alkyl, aryl, aralkyl, alkaryl, cycloalkyl, and the like groups.

$Y^1$ in Formula (I) may be a halogen (i.e., fluorine, bromine, chlorine, or iodine); a nitro group; a $C_{1-12}$ alkyl, alkenyl, or allyl group, a $C_{1-12}$ alkyloxy or alkenyl group, and the like, provided that $Y^1$ is substantially inert to and unaffected by the reactants and reaction conditions used to prepare the polycarbonate. The letter "m" in Formula (I) represents any integer from and including zero through the number of positions on $G^1$ available for substitution.

The letter "t" in Formula (I) represents an integer equal to at least one; "s" is either zero or one; and "u" represents zero or one.

Such polycarbonates may be produced by the interfacial reaction of the corresponding dihydroxy compounds with a carbonate precursor. Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as mixtures comprising at least one of the foregoing dihydroxy compounds.

A nonexclusive list of specific examples of suitable bisphenol compounds includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. Preferred polycarbonates are based on bisphenol A, in which u and t are each one, each $G^1$ is p-phenylene, each m is zero, s is one, and E is isopropylidene.

It is also possible to use two or more different dihydroxy compounds or a copolymer of a dihydroxy compounds with a glycol in the event a carbonate copolymer rather than a homopolymer is desired for use. Branched polycarbonates are also useful, as well as blends of linear polycarbonate and a branched polycarbonate. The branched polycarbonates may be prepared by adding a branching agent during polymerization.

These branching agents are well known, and include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of about 0.05-2.0 weight percent. Branching agents and procedures for making branched polycarbonates are described in U.S. Pat. Nos. 3,635,895 and 4,001,184, which are incorporated by reference. All types of polycarbonate end groups are contemplated as being useful in the thermoplastic composition.

Methods for the preparation of polycarbonates by interfacial polymerization are also known. Although the reaction conditions of the preparative processes may vary, several of the preferred processes typically involve dissolving or dispersing the dihydric phenol reactant in aqueous caustic soda or potash, adding the resulting mixture to a suitable water immiscible solvent medium and contacting the reactants with the carbonate precursor, such as phosgene, in the presence of a suitable catalyst such as triethylamine or a phase transfer catalyst, and under controlled pH conditions, e.g., about 8 to about 10. The most commonly used water immiscible solvents include methylene chloride, 1,2-dichloroethane, chlorobenzene, toluene, and the like.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ wherein X is Cl⁻, Br⁻ or – a $C_{1-8}$ alkoxy group or $C_{6-188}$ aryloxy group. An effective amount of a phase transfer catalyst may be about 0.1 to about 10 wt. %, about 0.5 to about 2 wt. % based on the weight of bisphenol in the phosgenation mixture.

Alternatively, melt processes may be used. A catalyst may be used to accelerate the rate of polymerization of the dihydroxy reactant(s) with the carbonate precursor. Representative catalysts include but are not limited to tertiary amines such as triethylamine, quaternary phosphonium compounds, quaternary ammonium compounds, and the like.

Alternatively, polycarbonates may be prepared by co-reacting, in a molten state, the dihydroxy reactant(s) and a diaryl carbonate ester, such as diphenyl carbonate, in the presence of a transesterification catalyst in a Banbury mixer, twin screw extruder or the like to form a uniform dispersion. Volatile monohydric phenol is removed from the molten reactants by distillation and the polymer is isolated as a molten residue.

The polycarbonates may be made in a wide variety of batch, semi-batch or continuous reactors. Such reactors are, for example, stirred tank, agitated column, tube, and recirculating loop reactors. Recovery of the polycarbonate may be achieved by any means known in the art such as through the use of an anti-solvent, steam precipitation or a combination of anti-solvent and steam precipitation.

The molecular weight of the polycarbonate product may be varied by controlling, among other factors, the feed rate of the reactants, the type of extruder, the extruder screw design and configuration, the residence time in the extruder, the reaction temperature, and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. In one embodiment, the average molecular weight of the polycarbonate is about 5,000 to about 100,000, more preferably about 10,000 to about 65,000, and most preferably about 15,000 to about 35,000.

In addition to the polycarbonates described above, it is also possible to use combinations of the polycarbonate with other thermoplastic polymers, for example combinations of polycarbonates and/or polycarbonate copolymers with polyesters. Suitable polyesters may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Exemplary polyesters for use as the matrix polymer comprise units of the formula

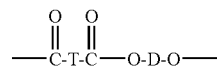

wherein each T is independently the same or different divalent $C_{6-10}$ aromatic group derived from a dicarboxylic acid or a chemical equivalent thereof, and each D is independently the same or different divalent $C_{2-4}$ aliphatic group derived from a dihydroxy compound or a chemical equivalent thereof. Copolyesters containing a combination of different T and/or D groups may be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters may be branched or linear.

In on embodiment, T is a divalent $C_{5-7}$ cycloaliphatic or CS-12 aromatic group, and D is a divalent $C_{6-12}$ cycloaliphatic or $C_{2-12}$ aliphatic group, specifically wherein T is selected from the group consisting of cyclohexylene, terephthalylene, isophthalylene, or a combination thereof, and D is selected from the group consisting of 1,4-cyclohexanedimethylene, ethylene, 1,2-propylene, 1,3-propylene, 1,4-butylene, and a combination thereof. Specific polyesters are obtained by copolymerizing a glycol component and an acid component comprising at least 70 mole %, preferably at least 80 mole %, of terephthalic acid, or polyester-forming derivatives thereof. A specific glycol, tetramethylene glycol, component may contain up to 30 mole %, preferably up to 20 mole % of another glycol, such as ethylene glycol, trimethylene glycol, 2-methyl-1,3-propane glycol, hexamethylene glycol, decamethylene glycol, cyclohexane dimethanol, neopentylene glycol, and the like, and mixtures comprising at least one of the foregoing glycols. A specific component may contain up to 30 mole %, preferably up to 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, and the like, and polyester-forming derivatives thereof, and mixtures comprising at least one of the foregoing acids or acid derivatives.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to provide copolyesters.

Specific exemplary polyesters include poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT). In one embodiment, the polyester is PET and/or PBT. In still another specific embodiment, the polyester is PBT. It is to be understood that such terephthalate-based polyesters may include small amounts of isopthalate esters as well.

While a combination of different polyesters may be used, it is specifically contemplated to use poly(butylene terephthalate), wherein the composition does not contain a polyester that meets the conditions wherein T is selected from the group consisting of cyclohexylene, terephthalylene, isophthalylene, and a combination thereof, and wherein D is selected from the group consisting of 1,4-cyclohexanedimethylene, ethylene, 1,2-propylene, 1,3-propylene, and a combination thereof.

It is further specifically contemplated to use poly(ethylene terephthalate), wherein the composition does not contain a polyester that meets the conditions wherein T is selected from the group consisting of cyclohexylene, terephthalylene, isophthalylene, and a combination thereof, and wherein D is selected from the group consisting of 1,4-cyclohexanedimethylene, ethylene, 1,2-propylene, 1,3-propylene, and a combination thereof.

The polyesters may have a weight average molecular weight of greater than 70,000 g/mol, specifically 70,000 to 200,000 g/mol, against polystyrene standards, as measured by gel permeation chromatography in chloroform/hexafluoroisopropanol (5:95, volume/volume ratio) at 25° C. The polyesters may have an intrinsic viscosity (as measured in phenol/tetrachloroethane (60:40, volume/volume ratio) at 25° C.) of 0.8 to 2.0 deciliters per gram.

In one general embodiment, the blends of a polycarbonate and a polyester may comprise about 1 to about 99 wt. % polycarbonate and correspondingly about 99 to about 1 wt. % polyester, in particular a poly(alkylene terephthalate). In one embodiment, the blend comprises about 30 to about 70 wt. % polycarbonate and correspondingly about 70 to about 30 wt. % polyester. The foregoing amounts are base on the total weight of the polycarbonate resin and polyester resin.

The matrix polymer may further be, or include, an impact modifier composition to increase its impact resistance. Thus, the impact modifiers may be present in amounts of about 1 to 100 weight percent (wt. %) of the matrix polymer component, specifically about 5 to about 60 wt. %, more specifically about 10 to about 40 wt. %, with the balance being other matrix polymer material.

These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (II):

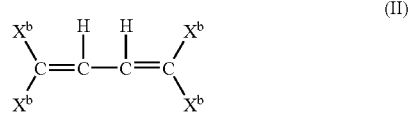

(II)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (III):

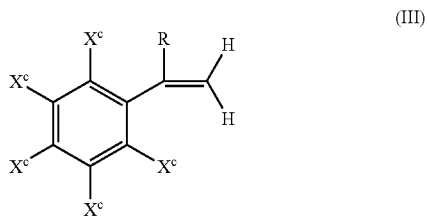

(III)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10):

(IV)

wherein R is hydrogen, $C_1$-$C_5$ alkyl, bromo, or chloro, and Xc is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

(Meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (II), (III), or (IV). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl(meth)acrylate, n-propyl(meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (III) or (IV), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions may be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide.

This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method may be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate, or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates, and other basic materials.

In the specific compositions comprising a poly(ethylene terephthalate and polycarbonate as a matrix, the impact modifier may be a natural rubber, low-density polyethylene, high-density polyethylene, polypropylene, polystyrene, polybutadiene, styrene-butadiene, styrene-butadiene-styrene, styrene-ethylene-butadiene-styrene, acrylonitrile-butadiene-styrene, acrylonitrile-ethylene-propylene-diene-styrene, styrene-isoprene-styrene, methyl methacrylate-butadiene-styrene, methyl methacrylate-acrylonitrile butadiene-styrene (?does this material exist?), (this is not an impact modifier), ethylene-propylene copolymer, ethylene-propylene-diene terpolymer, ethylene-methyl acrylate, an ethylene-ethyl acrylate, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide)glycol block copolymer, a silicone rubber, or a combination comprising at least one of the foregoing impact modifiers.

In a specific embodiment, the impact modifier is an emulsion polymer free of basic materials as described above. A good balance of properties is obtained when the impact modifier is a core-shell polymer selected from the group consisting of methyl(meth)acrylate-butadiene-styrenes, acrylonitrile-butadiene-styrenes, high rubber graft acrylonitrile-butadiene-styrenes, acrylonitrile-styrene-acrylates, high rubber graft acrylonitrile-butadiene-styrenes, butyl acrylates, ethyl acrylates, and combinations thereof. In one embodiment, the impact modifier is an acrylonitrile-butadiene-styrene, specifically a high rubber graft acrylonitrile-butadiene-styrene.

Fluoropolymers suitable for use as the fluoropolymer component are capable of being fibrillated ("fibrillatable") during mixing with the matrix polymer, the filler, or both simultaneously. "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include poly(tetrafluoroethylene), poly(hexafluoropropylene), poly(vinylidene fluoride), poly(chlorotrifluoroethylene), poly(ethylene-tetrafluoroethylene), fluorinated ethylene-propylene polymer, poly(vinyl fluoride), and poly(ethylene-chlorotrifluoroethylene). Combinations comprising at least one of the foregoing fluoropolymers may also be used.

As is known, fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers may be made by coagulation and drying of dispersion-manufactured fluoropolymers. Fine powder fluoropolymers are generally manufactured to have a particle size of approximately 400 to 500 microns. "Granular" fluoropolymers may be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

In one embodiment the fluoropolymer is at least partially encapsulated by an encapsulating polymer that may be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers.

The encapsulating polymers may be obtained by polymerization of monomers or mixtures of monomers by methods known in the art, for example, condensation, addition polymerization, and the like. Emulsion polymerization, particularly radical polymerization may be used effectively. In one embodiment, the encapsulating polymer is formed from monovinylaromatic monomers containing condensed aromatic ring structures, such as vinyl naphthalene, vinyl anthracene and the like, or monomers of formula (II) above. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of formula (III) above. Examples of monomers of formula (III) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl(meth)acrylate, n-butyl (meth)acrylate, t-butyl(meth)acrylate, n-propyl(meth)acrylate, isopropyl (meth)acrylate, 2-ethylhexyl(meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. % of monovinyl aromatic monomer, specifically about 30 to about 100 wt. %, more specifically about 50 to about 90 wt. % monovinylaromatic monomer, with the balance being comonomer(s).

Elastomers may also be used as the encapsulating polymer, as well as elastomer-modified graft copolymers. Suitable elastomers include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers are of formula (IV). Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt. % of one or more monomers copolymerizable therewith. Suitable copolymerizable monomers include the monovinylaromatic monomers of formula (II) and/or the monovinylic monomers of formula (III) above. Specific copolymers include styrene and acrylonitrile.

(Meth)acrylate monomers suitable for use as an elastomeric encapsulating monomer include the cross-linked, particulate emulsion homopolymers or copolymers of $C_{4-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{4-8}$ alkyl(meth)acrylate monomers may optionally be polymerized in admixture with up to 15 wt. % of comonomers of formulas (II), (III), or (IV). Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly (alpha-ethylstyrene), poly(alpha-propylstyrene), poly(alpha-butylstyrene), poly(p-methylstyrene), polyacrylonitrile, poly (methacrylonitrile), poly(methyl acrylate), poly(ethyl acrylate), poly(propyl acrylate), and poly(butyl acrylate), poly(methyl methacrylate), poly(ethyl methacrylate), poly (propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly($C_{4-8}$ alkyl acrylate) rubbers, styrene-butadiene rubbers (SBR), EPDM rubbers, silicon rubber and combinations comprising at least one of the foregoing encapsulating polymers.

In another embodiment, the encapsulating polymer comprises SAN, ABS copolymers, alpha-($C_{1-3}$)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN. In one embodiment, the fluoropolymer is encapsulated by an encapsulating polymer selected from the group consisting of styrene-acrylonitrile copolymers, acrylonitrile-butadiene-styrene copolymers, alpha-alkyl-styrene-acrylonitrile copolymers, methyl methacrylates, alpha-methylstyrene-acrylonitrile copolymers, styrene-butadiene rubbers, or combinations thereof. In one embodiment the fluoropolymer comprises styrene-acrylonitrile encapsulated poly(tetrafluoroethylene).

Suitable amounts amount of encapsulating polymer may be determined by one of ordinary skill in the art without undue experimentation, using the guidance provided below. In one embodiment, the encapsulated fluoropolymer comprises about 10 to about 90 weight percent (wt. %) fluoropolymer and about 90 to about 10 wt. % of the encapsulating polymer, based on the total weight of the encapsulated fluoropolymer. Alternatively, the encapsulated fluoropolymer comprises about 20 to about 80 wt. %, more specifically about 40 to about 60 wt. % fluoropolymer, and about 80 to about 20 wt. %, specifically about 60 about 40 wt. % encapsulating polymer, based on the total weight of the encapsulated polymer.

The polymer composition further comprises a filler, including the fillers and solid compounding ingredients or agents commonly used in polymeric compositions. Without being bound by theory, it is believed that the advantageous results obtained herein are due to a synergistic interaction between the filler and fluoropolymer, which interaction arises during the mixing process described below.

One useful class of fillers is the particulate fillers, which may be of any configuration, for example spheres, plates, fibers, acicular, flakes, whiskers, or irregular shapes. Suitable fillers typically have an average longest dimension of about 1 nanometer to about 500 micrometers, specifically about 10 nanometers to about 100 micrometers. The average aspect ratio (length:diameter) of some fibrous, acicular, or whisker-shaped fillers (e.g., glass or wollastonite) may be about 1.5 to about 1000, although longer fibers are also within the scope of the invention. The mean aspect ratio (mean diameter of a circle of the same area:mean thickness) of plate-like fillers (e.g., mica, talc, or kaolin) may be greater than about 5, specifically about 10 to about 1000, more specifically about 10 to about 200. Bimodal, trimodal, or higher mixtures of aspect ratios may also be used. These fillers are also known as "reinforcing fillers."

The fillers may be of natural or synthetic, mineral or non-mineral origin, provided that the fillers have sufficient thermal resistance to maintain their solid physical structure at least at the processing temperature of the composition with which it is combined. Suitable fillers include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IVb, IVa, IVb (except carbon), Va, VIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are useful. It has been found that mica, talc, silicon carbide, and combinations comprising at least one of the foregoing fillers are of specific utility.

In the specific compositions comprising a polyester and polycarbonate as the matrix, the reinforcing particulate filler is preferably calcium carbonate, mica, kaolin, talc, glass fibers, carbon fibers, magnesium carbonate, sulfates of barium, calcium sulfate, titanium, nanoclay, silica, hydroxides of aluminum or ammonium or magnesium, zirconia, nanoscale titania, or a combination thereof. Talc may be specifically mentioned, specifically talc having an average particle size of 0.3 to 3 micrometers, even more specifically 0.5 to 2 micrometers.

Alternatively, or in addition to a particulate filler, the filler may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the fillers may be surface modified, for example treated so as to improve the compatibility of the filler and the polymeric portions of the compositions, which facilitates deagglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

The relative amounts of matrix polymer component, fluoropolymer, and filler may be adjusted by one of skill in the art without undue experimentation, in order to achieve the desired properties of the compositions, using the guidance provided below. In one embodiment, the compositions comprise about 5 to about 99 wt. % matrix polymer component (including any impact modifier), about 0.5 to about 40 wt. % unencapsulated fluoropolymer, and about 0.5 to about 60 wt. % filler, each based on the total weight of the composition (matrix, fluoropolymer, filler, and any additives, non-limiting examples of which are described below). Alternatively, the compositions may comprise about 20 to about 90, more specifically about 30 to about 85 wt. %, even more specifically about 50 to about 85 wt. % matrix polymer; about 1 to about 40 wt. %, more specifically about 2 to about 20 wt. %, even more specifically about 2.5 to about 10 wt. % unencapsulated fluoropolymer; and about 3 to about 40 wt. %, more specifically about 5 to about 30 wt. %, even more specifically about 5 to about 15 wt. % filler, each based on the total weight of the composition. Particularly advantageous results may be achieved when the amount of fluoropolymer is greater than about 2.5 wt. %, more specifically about 5 to about 35 wt. %, even more specifically about 10 to about 30 wt. % of the total weight of the composition.

In another embodiment, the compositions comprise about 5 to about 99 wt. % matrix polymer, about 0.5 to about 60 wt. % encapsulated fluoropolymer, and about 0.5 to about 60 wt. % filler, each based on the total weight of the composition. Alternatively, the thermoplastic compositions may comprise about 20 to about 90, more specifically about 30 to about 85 wt. %, even more specifically about 60 to about 85 wt. % matrix polymer; about 1 to about 50 wt. %, more specifically about 2 to about 45 wt. % encapsulated fluoropolymer; and about 0.5 to about 50 wt. %, more specifically about 5 to about 30 wt. %, even more specifically about 5 to about 15 wt. % filler, each based on the total weight of the composition. Particularly advantageous results may be achieved when the amount of encapsulated fluoropolymer is greater than about 2.5 wt. %, more specifically about 5 to about 35 wt. %, even more specifically about 10 to about 30 wt. % of the total weight of the composition.

It has unexpectedly been found that a specific combination of components may be use to obtain compositions having an excellent balance of properties. In this embodiment, the composition comprise, based on the total weight of the composition, from 10 to 80 wt. % of a polybutylene terephthalate, specifically 20 to 70 wt. %, more specifically 20 to 50 wt. % of a polybutylene terephthalate; from 10 to 80 wt. % of a polycarbonate, specifically 15 to 70 wt. %, more specifically 40 to 60 wt. % of a polycarbonate; from 0 to 20 wt. % of an impact modifier, specifically 3 to 15 wt. % of an impact modifier; from 1 to less than 25 wt. %, specifically 2 to 20 wt. %, more specifically 2 to 15 wt. % of a reinforcing filler; from 0.1 to less than 2.5 wt. % of a fibrillated fluoropolymer, specifically 0.2 to less than 2.5 wt. %, more specifically from 1 to 2 wt. % of a fibrillated fluoropolymer; and from 0 to 5 wt. %, specifically more than zero to 4 wt. % of an additive composition as described in more detail below.

In this specific embodiment, the compositions may consist essentially of the foregoing components. The polycarbonate may comprise units derived from bisphenol A. The impact modifier may be a acrylonitrile-butadiene-styrene or methyl methacrylate-butadiene-styrene impact modifier, specifically a core-shell methyl methacrylate-butadiene-styrene. The reinforcing filler may be a talc. The fibrillated fluoropolymer may be encapsulated, specifically with styrene-acrylonitrile. In one embodiment, the additive is selected from the group consisting of antioxidants, mold release agents, colorants, quenchers, stabilizers, and combinations thereof.

Optionally the polymer composition may further contain one or more additives ordinarily incorporated in resin compositions of this type, preferably with the proviso that the additive(s)s are selected so as to not significantly adversely affect the desired properties of the thermoplastic composition. Mixtures of additives may be used. Such additives may be mixed at a suitable time during the mixing of the components for forming the composition. Exemplary additives include extenders, lubricants, flow modifiers, fire retardants, pigments, dyes, colorants, UV stabilizers, antioxidants, impact modifiers, plasticizers, optical brighteners, flame proofing agents, anti-static agents, blowing agents, and the like.

Suitable antioxidant additives include, for example, organophosphites such as tris(nonyl phenyl)phosphite, tris(2,4-di-t-butylphenyl)phosphite, (2,4,6-tri-tert-butylphenyl)(2-butyl-2-ethyl-1,3-propanediol)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; acylaminophenols; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.1 to about 5 parts by weight, based on 100 parts by weight of the polymeric portion of the composition (matrix polymer, fluoropolymer, and any impact modifier).

Suit table heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, and combinations comprising at least one of the foregoing heat stabilizers. Heat stabilizers are generally used in amounts of about 0.1 to about 5 parts by weight, based on 100 parts by weight of the polymeric part of the composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.5 to about 20 parts by weight, based on 100 parts by weight of the polymer portion of the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-

(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2, 2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.5 to about 20 parts by weight, based on 100 parts by weight of the polymer portion of the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; sodium, calcium or magnesium salts of fatty acids such as lauric acid, palmitic acid, oleic acid or stearic acid; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax, EBS wax, or the like. Such materials are generally used in amounts of about 0.1 to about 20 parts by weight, based on 100 parts by weight of the polymer portion of the composition.

The term "antistatic agent" refers to monomeric, oligomeric, or polymeric materials that may be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®REB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.05 to about 20 parts by weight, based on 100 parts by weight of the polymer portion of the composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 20 parts by weight, based on 100 parts by weight of the polymer portion of the composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazoliumperchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.01 to about 20 parts by weight, based on 100 parts by weight of the polymer portion of the composition.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of about 0.01 to about 15 parts by weight, based on 100 parts by weight of the polymer portion of the composition.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

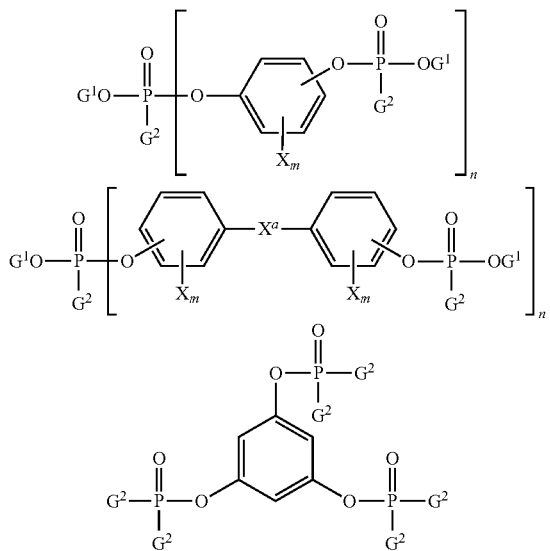

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 1 to about 60 parts by weight, more specifically about 5 to about 25 parts by weight, based on 100 parts by weight of polycarbonate resin and any impact modifier.

Halogenated materials may also be used as flame retardants, for example halogenated compounds and resins of formula (11):

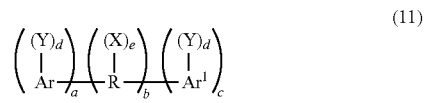

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R may also consist of two or more alkylene or alkylidene linkages connected by such groups as aromatic, amino, ether, carbonyl, sulfide, sulfoxide, sulfone, or the like.

Ar and Ar' in formula (11) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' may be varied in the ortho, meta or para positions on the aromatic rings and the groups may be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 5 to about 50 parts by weight, more specifically about 5 to about 20 parts by weight, based on 100 parts by weight of the polymer portion of the composition.

Alternatively, the thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination may occur resulting in bromine and/or chlorine levels typically on the parts per million by weight scale. With this understanding it may be readily appreciated that essentially free of bromine and chlorine may be defined as having a bromine and/or chlorine content of less than about 100 parts per million by weight (ppm), less than about 75 ppm, or less than about 50 ppm. When this definition is applied to the fire retardant it is based on the total weight of the fire retardant. When this definition is applied to the thermoplastic composition it is based on the total weight of the polymer portion of the composition and fire retardant.

Inorganic flame retardants may also be used, for example salts of $C_{2-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 5.0 parts by weight, more specifically about 0.02 to about 3.0 parts by weight, based on 100 parts by weight of the polymer portion of the composition.

Another useful type of flame retardant is a polysiloxane-polycarbonate copolymer comprising repeating structural units of formula (12):

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer. The value of D in formula (8) may vary widely depending on the type and relative amount of each component in the thermoplastic composition, the desired properties of the composition, and like considerations. Generally, D may have an average value of 2 to about 1,000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of the following formula (13):

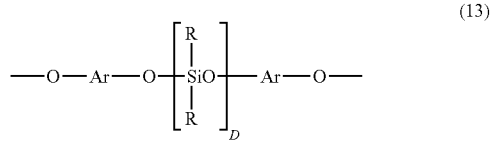

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used. Such units may be derived from the corresponding dihydroxy compound of the following formula:

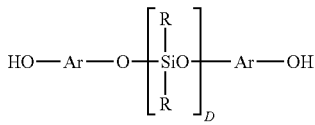

wherein Ar and D are as described above. Such compounds are further described in U.S. Pat. No. 4,746,701 to Kress et al. Compounds of formula (10) may be obtained by the reaction of a dihydroxyarylene compound with, for example, an alpha, omega-bisacetoxypolydiorganosiloxane under phase transfer conditions.

In another embodiment, the polydiorganosiloxane blocks are provided by repeating structural units of formula (13)

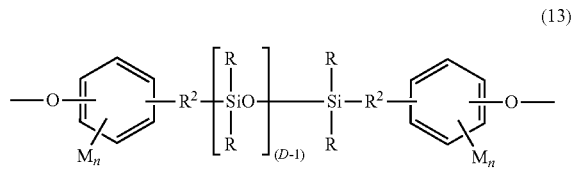

(13)

wherein R and D are as defined above. $R^2$ in formula (10) is a divalent $C_2$-$C_8$ aliphatic group. Each M in formula (9) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4. In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl. Units of formula (10) may be derived from the corresponding dihydroxy polydiorganosiloxane 11):

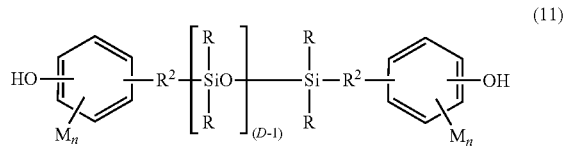

(11)

wherein R, D, M, $R^2$, and n are as described above. Such dihydroxy polysiloxanes may be made by effecting a platinum catalyzed addition between a siloxane hydride of the following formula

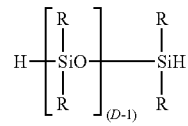

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming polycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of the polymer portion of the composition.

Neutralizing additives may be for example, melamine, polyvinylpyrrolidone, dicyandiamide, triallyl cyanurate, urea derivatives, hydrazine derivatives, amines, polyamides, and polyurethanes; alkali metal salts and alkaline earth metal salts of higher fatty acids, such as for example, calcium stearate, calcium stearoyl lactate, calcium lactate, zinc stearate, magnesium stearate, sodium ricinoleate, and potassium palmitate; antimony pyrocatecholate, zinc pyrocatecholate, and hydrotalcites and synthetic hydrotalcites. Hydroxy carbonates, magnesium zinc hydroxycarbonates, magnesium aluminum hydroxycarbonates, and aluminum zinc hydroxycarbonates; as well as metal oxides, such as zinc oxide, magnesium oxide and calcium oxide; peroxide scavengers, such as, e.g., ($C_{10}$-$C_{20}$)alkyl esters of beta-thiodipropionic acid, such as for example the lauryl, stearyl, myristyl or tridecyl esters; mercapto benzimidazole or the zinc salt of 2-mercaptobenzimidazole, zinc-dibutyldithiocarbamate, dioctadecyldisulfide, and pentaerythritol tetrakis(.beta.-dodecylmercapto)propionate may also be used. When present, the neutralizers may be used in amounts of about 5 to about 50 parts by weight, more specifically about 10 to about 40 parts by weight, based on 100 parts by weight of the polymer portion of the composition.

In yet another embodiment, the optional additive is a polyamide stabilizer, such as, copper salts in combination with iodides and/or phosphorus compounds and salts of divalent manganese. Examples of sterically hindered amines include but are not restricted to triisopropanol amine or the reaction product of 2,4-dichloro-6-(4-morpholinyl)-1,3,5-triazine with a polymer of 1,6-diamine, N,N'-Bis(−2,2,4,6-tetramethyl-4-piperidinyl)hexane.

In a specific embodiment a composition consists essentially of from 20 to 70 wt. % of a poly(butylene terephthalate); from 15 to 70 wt. % of a polycarbonate comprising carbonate units derived from bisphenol-A; from 3 to 15 wt. % of an impact modifier selected from the group consisting of acrylonitrile-butadiene-styrene, methyl methacrylate-butadiene-styrene impact modifiers, and combinations thereof, from 2 to 20 wt. % of a talc; from 0.2 to less than 2.5 wt. % of styrene-acrylonitrile encapsulated poly(tetrafluoroethylene)); and from 0.1 to 5 wt. % of an additive selected from the group consisting of antioxidants, mold release agents, colorants, quenchers, stabilizers, and combinations thereof. In one embodiment, the composition consists essentially of the poly(butylene terephthalate), the polycarbonate, the impact modifier, the talc, the additive, and the poly(tetrafluoroethylene) in the foregoing amounts.

In an even more specific embodiment a composition consists essentially of from 20 to 50 wt. % of a polybutylene terephthalate; from 40 to 60 wt. % of a bisphenol-A polycarbonate; from 3 to 15 wt. % of a core-shell methyl methacrylate-butadiene-styrene impact modifier; from 2 to 15 wt. % of a talc having an average particle size of 0.5 to 2 micrometers; from 1 to 2 wt. % of styrene-acrylonitrile encapsulated poly(tetrafluoroethylene); and from 0 to 4 wt. % of an additive composition selected from the group consisting of antioxidants, mold release agents, colorants, quenchers, stabilizers, and combinations thereof. Alternatively, the composition consists of the polybutylene terephthalate, the polycarbonate, the impact modifier, the talc, the additive, and the poly(tetrafluoroethylene) in the foregoing amounts.

Also disclosed is a method of forming the disclosed composition comprising melt blending the components of the composition. The components of the composition are mixed under conditions of shear and temperature effective to produce the desired characteristics in the mixed composition, in particular improved tensile modulus and/or ductility. Without being bound by theory, it is believed that such improvements are achieved by in situ fibrillation of the fluoropolymer. Suitable mixing methods for achieving the desired shear and temperature conditions may be, for example, extrusion kneading, roll kneading, or mixing in a two-roll mill, a Banbury mixer, a single screw or twin-screw extruder, a double blade batch mixer, a vertical shaft mixer, a planetary mixer, a Becken blade mixer, a dispersion blade mixer, a sigma mixer, in continuous batch mixers of the hydrofoil, turbine blade, or CF impeller blade type, static mixers and the like devices, which are capable of imparting a controlled degree of shear. In one embodiment a single screw or a twin-screw extruder is used. The twin-screw extruder may be co-rotating, counter rotating, intermeshing, non-intermeshing, or the like, for example a, planetary gear extruder continuous mixer. The mixing may be conducted in a continuous or a batch process. When melt blending or reactive melt blending is used, the mixing is generally conducted at a temperature and for a time effective to produce a molten mixture of a substantially homogenous composition.

The time, temperature, apparatus, component addition sequence and location (along an extruder, e.g.), and other conditions of mixing are accordingly selected so as to produce a composition having an improved modulus compared to compositions not containing both filler and fluoropolymer. Those of ordinary skill in the art will be able to adjust the degree of shear and temperature, as well as other parameters, without undue additional experimentation using the guidance provided herein.

In one embodiment, the polymer compositions may be prepared by pre-combining the matrix polymer, fluoropolymer, and filler prior to mixing under suitable conditions of temperature and shear, although such pre-combining is not necessary. The pre-combining may be carried out in any conventional mixer (e.g., drum mixer, ribbon mixer, vertical spiral mixer, Muller mixer, sigma mixer, chaotic mixer, static mixer, and the like). Pre-combining is typically carried out at a temperature below the degradation temperature of the matrix polymer, fluoropolymer, and any encapsulating polymer. Alternatively, a portion of the matrix polymer may be pre-combined with the fluoropolymer (with or without one or more additives) to prepare a masterbatch, and then the remaining matrix polymer may be added and mixed therewith later.

In general, suitable mixing (fibrillation) conditions include temperatures at or above the glass transition temperature of the matrix polymer and below the softening temperature of the fluoropolymer. The mixing temperature is also preferably below the degradation temperature of the matrix polymer. Suitable temperatures may be about 20° C. to about 450° C., more specifically about 50° C. to about 400° C., even more specifically about 100° C. to about 300° C. At these temperatures, processing may be conducted for about 2 seconds to about 10 hours, specifically about 3 seconds to about six hours.

For compositions comprising a polycarbonate-containing matrix polymer component, the mixing may be carried out in a twin-screw extruder, using for example, a temperature profile in the range of 20-300° C., for example 50, 200, 250, 260, 270, 270, 275° C., a feed rate of 5-25 kilogram/hour, and a torque of 50-80%, specifically 60-65%. Such conditions will yield a network, or node and fibril structure in the fluoropolymer.

A modulated differential scanning calorimetry (DSC) method for determining extent of fibrillation of the fluoropolymer in the various compositions was may be used to monitor the course and degree of fibrillation. For example a Q1000 differential scanning calorimeter from TA Instruments may be used to conduct DSC is conduct on approximately 1 to 5 mg of sample, and observations recorded around 320 to 360° C. (modulation range). A peak around 330° C. is observed, and may be deconvoluted into three different peaks, wherein the different peak temperatures correspond to different forms of fluoropolymer. A plot was constructed using the raw data points from MDSC, and through baseline adjustment a clear magnified peak was observed (after subtraction). Deconvolution was made to fit gauss Ian curves around 326° C. for melt crystallized PTFE, 330° C. for fibrillated PTFE, and 338° C. for native PTFE (nodal PTFE). The area under each curve was found to have a strong correlation with optimization of properties such as tensile modulus. In particular, a Node:Fibril ratio may be calculated based on the area under 338° C. peak (node) and 330° C. peak (fibril).

In one embodiment, the mixed fluoropolymer comprises fibrils having an average diameter of about 5 nanometers to about 2 micrometers. The fluoropolymer may also have an average fibril diameter of about 30 to about 750 nanometers, more specifically about 5 to about 500 nanometers. (Average diameters may be measured by scanning electron microscopy (SEM)). The ratio of the node fraction to fibril fraction (as reflected in the area under the curve in the DSC determinations) of the mixed fluoropolymers may be less than about 2.5, specifically less than about 2, and even more specifically less than about 1.

After mixing, the composition so formed may be made into a particulate form, for example by pelletizing or grinding. For example, the molten mixture from an extruder may be fed into a die. Some nonlimiting examples of suitable dies include an annular die, coat hanger die, spiral mandrel die, crosshead die, T-die, fishtail die, spider die, single, or double roller die, or profile extrusion die.

In an advantageous feature, the mixed compositions of the present invention have a tensile modulus of about 1.5 GPa to about 20 GPa, specifically about 2.5 to about 15, more specifically about 3.5 to about 10 GPa, where tensile modulus may be determined in accordance with ISO 527 at room temperature, using a rate of pull of 1 mm/minute until 1% strain followed by 5 mm/minute until the sample breaks. In some embodiments, the improved modulus may be obtained without significant degradation of the other properties of the composition. In other embodiments, the improved modulus is obtained together with good ductility and/or good flow.

The mixed compositions may have good or improved ductility, as reflected by nominal elongation at break, Notched Izod impact, strength, and/or diametral impact strength. For example, the mixed compositions may have a nominal elongation at break of greater than 20%. In another embodiment, the nominal elongation at break may be about 200 to about 20%, specifically about 100 to about 30%. Compositions having a tensile modulus of greater than about 3.5 GPa, together with a nominal elongation at break of greater than about 20%, greater than about 30%, greater than about 40%, or greater than about 50%, may be achieved, as well as compositions having a tensile modulus of greater than or about 4 GPa, together with a nominal elongation at break of greater about 30%, greater than about 40%, or greater than about 50%. Again, tensile modulus and elongation to break may be determined in accordance with ISO 527 at room temperature, using a rate of pull of 1 mm/minute until 1% strain followed by 5 mm/minute until the sample breaks.

The mixed compositions may have an unnotched impact strength, determined in accordance with ISO 180/U at room temperature, of about 40.0 or higher (No break (NB)), specifically about 60 to NB, more specifically about 100 to about 180 kilojoules per square meter ($KJ/m^2$).

The flexural modulus of the compositions may be about 1.0 to about 20 GPa, specifically about 2 to about 15 GPa, more specifically about 2.5 to about 10 GPa, measured in accordance with ISO 178, at room temperature.

The flexural strength of the compositions may be about 50 to about 200 MPa, specifically about 60 to about 150 Mpa, more specifically about 80 to about 120 MPa, measured in accordance with ISO 178, at room temperature with a pulling speed of 2 mm/min.

The mixed compositions may have an Notched impact strength, determined in accordance with ISO 180 at 23° C., of about 5 to about 120, specifically about 10 to about 100, more specifically about 15 to about 50 kilojoules per square meter ($KJ/m^2$).

The mixed compositions may have a coefficient of thermal expansion (CTE) of less than about $5.5 \times 10^{-5}$ m/m/° C. (measured over 40 to 80° C.). More specifically, the mixed compositions may have a CTE of less than about $5.0 \times 10^{-5}$ m/m/° C., less than about $4.5 \times 10^{-5}$ m/m/° C., less than about $4.0 \times 10^{-5}$ m/m/° C., less than about $3.5 \times 10^{-5}$ m/m/° C., or less than about $3.0 \times 10^{-5}$ m/m/° C. (each measured over –40 to 80° C.). In still other embodiments, the range of acceptable CTEs may be somewhat broader, that is, a CTE of about $10 \times 10^{-5}$ m/m/° C. to about $2 \times 10^{-5}$ m/m/° C., more specifically about $8 \times 10^{-5}$ m/m/° C. to about $3 \times 10^{-5}$ m/m/° C. (each measured over –40 to 80° C.). In another embodiment, the mixed compositions may have a CTE of less than about $5.5 \times 10^{-5}$ m/m/° C. (measured over –40 to 120° C.). More specifically, the mixed compositions may have a CTE of less than about $5.0 \times 10^{-5}$ m/m/° C., less than about $4.5 \times 10^{-5}$ m/m/° C., less than about $4.0 \times 10^{-5}$ m/m/° C., less than about $3.5 \times 10^{-5}$ m/m/° C., or less than about $3.0 \times 10^{-5}$ m/m/° C. (each measured over 40 to 120° C.). Again, in still other embodiments, the CTE may be somewhat broader, that is, a CTE of about $10 \times 10^{-5}$ m/m/° C. to about $2 \times 10^{-5}$ m/m/° C., more specifically about $8 \times 10^{-5}$ m/m/° C. to about $3 \times 10^{-5}$ m/m/° C. (each measured over 40 to 120° C.). The CTE may be determined using ASTM E-831.

A good balance of properties is obtained in the specific compositions comprising a polyester (PET, or others)), a polycarbonate, an impact modifier, a fibrillated copolymer, a reinforcing filler, and optional additives. In this embodiment, the composition may have a heat deflection temperature (HDT) of at least 100° C., measured in accordance with to ASTM D648 on 3.2 mm thick bars at 0.455 MPa. Still further, these compositions have a heat deflection temperature of at least 110° C., more specifically at least 115° C., and most specifically at least 120° C. measured in accordance with to ASTM D648 on 3.2 mm thick molded bars at 0.455 MPa.

The compositions may further have an improved Notched Izod impact strength that is at least 20% more than the Notched Izod impact strength of an identical composition without the fibrillated fluoropolymer, wherein the notched Izod impact strength is measured in accordance with ASTM D256 at 23° C. on 3.2 mm thick bars. In another embodiment, the compositions may have an improved Notched Izod impact strength that is at least 40% more than the Notched Izod impact strength of an identical composition without the fibrillated fluoropolymer, wherein the notched Izod impact strength is measured in accordance with ASTM D256 at 23° C. on 3.2 mm thick bars. In still another embodiment, the compositions may have an improved Notched Izod impact strength that is at least 100% more than the Notched Izod impact strength of an identical composition without the fibrillated fluoropolymer, wherein the notched Izod impact strength is measured in accordance with ASTM D256 at 23° C. on 3.2 mm thick bars.

Still further, these compositions may have a flexural modulus that is higher or within 5% of the flexural modulus of an identical composition without the fibrillated fluoropolymer, wherein flexural modulus is measured in accordance with ASTM D790 at 23° C.

It is also possible to manufacture compositions having good flame retardance, that is, compositions wherein a sample having a thickness of 1.2 mm or greater achieves a UL94 rating of V1. It is also possible to manufacture compositions wherein a sample having a thickness of 1.2 mm or greater achieves a UL94 rating of V0, Such compositions may further, at a thickness of 1.5 mm, achieve a UL94 rating of V1 and/or V0. Flame retardancy tests were performed following the procedure of Underwriter's Laboratory Bulletin 94 entitled "Tests for Flammability of Plastic Materials, UL94." According to this procedure, materials may be classified as HB, V0, V1, V2, VA, and/or VB on the basis of the test results obtained for five samples. To achieve a rating of V0, in a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds. To achieve a rating of V1, in a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

Flame retardant additives as described above may be used to aid in achieving flame retardancy. When present, such additives may affect the mechanical properties of the compositions, particularly nominal elongation to break. The nominal elongation to break of flame retardant compositions may be about 1% to about 15%, specifically about 3% to about 12%, more specifically greater about 5% to about 10%, determined in accordance with ISO 527 at room temperature, using a rate of pull of 1 mm/minute until 1% strain followed by 5 mm/minute until the sample breaks.

In addition, the compositions may have good weatherability, as evidenced by improved resistance to ultraviolet radiation, maintenance of gloss, solvent resistance, recycling capability by regrind, and the like. In one embodiment, good mechanical properties are obtained in combination with good flow properties, in particular flow properties that render the compositions suitable for injection molding of thin wall parts (e.g., parts having a wall thickness of less than about 2.5 mm, less than about 2.0 mm, or even less than about 1.5 mm). Flow properties for the molding of small parts may also be achieved, as well as flow properties for the molding of large parts such as automobile door panels, fenders, bumpers, and the like.

Also disclosed are articles comprising the composition. Further disclosed is a method of making an article comprising melt blending the components of the composition and injection molding, extrusion molding, rotation molding, foam molding, calendar molding, blow molding, thermoforming, compaction, melt spinning, and the like, the melt blended composition to form the article. Because of their advantageous mechanical characteristics, especially preferred are articles that will be exposed to ultraviolet (UV) light, whether natural or artificial, during their lifetimes, and most particularly outdoor and indoor articles. Suitable articles are exemplified by but are not limited to aircraft, automotive, truck, military vehicle (including automotive, aircraft, and waterborne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications. In one embodiment, the article is a power tool housing.

The invention is further illustrated by the following non-limiting examples.

EXAMPLES

Polycarbonate ("PC," LEXAN® 105, from General Electric Company (now SABIC INNOVATIVE PLASTICS), was used as the matrix polymer in the following examples. The fluoropolymer used was PTFE/SAN, synthesized by aqueous emulsion polymerization as disclosed in U.S. Pat. No. 5,804,654, except where noted. All compositions further included up to 1 wt. % lubricant and up to 2 wt. % of an antioxidant package.

The components (amounts expressed in percent weight, based on the total weight of the polymer composition) shown in Tables 1 and 2 were subjected to dry mixing, fed into a ZSK 25 co-rotating twin-screw extruder from WERNER and PFLEIDERER coextruder, and mixed at a barrel temperature of about 275° C., maintaining a torque at 80 percent, and a screw rotation rate of 300 rotations per minute (rpm). The extrudate was then fed into a high-speed pelletizer.

The resulting pellets were dried for at least 4 hours at 80° C. before injection molding into mold suitable for the formation of ASTM/ISO test specimens. An L&T Demag De-Tech 60T LNC4-E injection molding machine was used, operated at a temperature of about 280° C.

Tensile modulus, yield stress, nominal elongation to break (break strain), unnotched Izod impact strength, and CTE were determined in accordance with the above ISO methods. "NB" in the following Tables means that the sample did not break, and may therefore be considered high impact.

Results for examples 1-27 are shown in Table 1.

TABLE 1

| Ex. No. | Resin | Filler Type | Filler (wt. %) | Fluoro-polymer (wt. %) | Tensile Modulus (GPa) | Yield Stress (Mpa) | Break Strain (%) | Unnotched Impact Strength (KJ/m²) | CTE (×10⁻⁵ m/m/° C. |
|---|---|---|---|---|---|---|---|---|---|
| 1 | PC | Silicon Carbide (8 μm) | 10 | 15 | 4.07 | 72.98 | 9.28 | NB | — |
| 2 | PC | Mica (55 μm) | 10 | 10 | 4.57 | 70.84 | 17.15 | NB | — |
| 3 | PC | Silicon carbide (0.4 μm) | 10 | 10 | 3.62 | 69.77 | 74.68 | NB | — |
| 4 | PC | Wollastonite [f] | 10 | 10 | 4.10 | 69.32 | 42.40 | NB | — |
| 5 | PC | Wollastonite [g] | 10 | 10 | 4.03 | 68.87 | 41.04 | NB | — |
| 6 | PC | Epoxy-coated Mica (55 μm) | 10 | 10 | 4.36 | 74.49 | 16.64 | NB | — |
| 7 | PC | Hydrous Aluminosilicate [a] | 10 | 10 | 4.00 | 72.83 | 42.98 | NB | — |
| 8 | PC | Wollastonite (10 μm) [b] | 10 | 10 | 4.00 | 73.88 | 11.80 | NB | — |
| 9 | PC | Epoxy-coated Talc | 10 | 10 | 4.68 | 76.56 | 17.36 | NB | — |
| 10 | PC | Mica + Pigment (9 + 1 by weight) | 10 | 10 | 4.61 | 71.96 | 18.36 | NB | — |
| 11 | PC | Mica [d] | 10 | 10 | 4.58 | 74.30 | 17.46 | NB | — |
| 12 | PC | Carbon fiber [c] | 10 | 0 | 3.53 | 68.04 | 12.37 | 150.98 | — |
| 13 | PC | Carbon fiber [c] | 10 | 10 | 5.74 | 76.74 | 6.72 | 154.25 | — |
| 14 | PC | Carbon Fiber [c] + Mica (55 μm) (1:1 by weight) | 10 | 10 | 4.94 | 73.47 | 5.61 | 194.78 | — |
| 15 | PC | Mica (6 μm + 55 μm) | 10 | 10 | 5.20 | 75.88 | 32.56 | NB | — |
| 16 | PC | Mica (6 μm + 10 μm) | 10 | 10 | 4.80 | 73.55 | 43.17 | NB | — |
| 17 | PC | Mica [h] (10 μm) | 10 | 10 | 5.17 | 76.94 | 20.73 | NB | — |
| 18 | PC | Mica [d] | 10 | 10 | 5.83 | 64.05 | 6.16 | — | — |
| 19 | PC | Mica [d] (6 μm) | 10 | 10 | 5.15 | 76.80 | 64.20 | NB | 4.05 [k] |
| 20 | PC | Silicon carbide (8 μm) | 10 | 15 | 4.07 | 72.98 | 9.28 | NB | — |
| 21 | PC | Mica [i] (55 μm) | 5 | 5 | 3.39 | 66.68 | 76.17 | NB | — |
| 22 | PC | Mica [i] (55 μm) | 7.5 | 7.5 | 4.04 | 69.02 | 61.39 | NB | — |
| 23 | PC | Mica [d] (6 μm) | 12.5 | 12.5 | 6.37 | 81.92 | 19.88 | NB | — |
| 24 | PC | Mica [d] (6 μm) | 15 | 15 | 7.19 | 84.44 | 11.48 | 233.23 | 3.60 [k] |
| 25 | PC | Mica [d] (6 μm) | 15 | 12.5 | 6.87 | 83.88 | 15.18 | NB | — |
| 26 | PC | Silicon carbide [j] (0.4 μm) | 10 | 15 | 4.14 | 73.13 | 34.85 | NB | — |
| 27 | PC | Nanoclay [e] | 2.5 | 10 | 3.72 | 70.10 | 4.11 | 196.05 | — |

[a] Engelhard-ASP NC
[b] Wolkem 1008
[c] Tortafil 202
[d] Alsibronz 6
[e] Closite 20A
[f] NYCO 1
[g] NYCO 1
[h] Alsibronz 10
[i] Alsibronz 55
[j] Silicon carbide
[k] measured over −40 to +80° C.

The above data shows that compositions in accordance with the present invention have excellent modulus, as reflected, for example by Ex. 19. The CTE of certain of the examples is also excellent, in the range of $4.05 \times 10^{-5}$ m/m/° C. The properties of samples using mica or talc as fillers showed particularly good results.

Additional examples 28-37 in accordance with the invention were prepared, in which the matrix polymer composition and/or additives were varied as indicated (all amounts are in weight percent). The Examples were prepared and tested as described above. Results are shown in Table 2.

TABLE 2

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m²) | CTE (×10⁻⁵ m/m/° C.) |
|---|---|---|---|---|---|---|---|---|---|
| 28 | PC/ABS (28%) | Mica (6 μm) | 10 | 10 | 4.66 | 68.19 | 27.25 | NB | 4.64 [k] |
| 29 | PC | Talc | 10 | 5 | 4.25 | 69.21 | 41.34 | NB | — |

TABLE 2-continued

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m$^2$) | CTE (×10$^{-5}$ m/m/° C.) |
|---|---|---|---|---|---|---|---|---|---|
| 30 | PC/Epoxy$^a$ (5%) | Mica (6 μm) | 10 | 10 | 5.68 | 84.63 | 23.29 | NB | — |
| 31 | PC/BPADP (5%) | Mica (6 μm) | 10 | 10 | 5.79 | 83.40 | 17.57 | 224.44 | — |
| 32 | PC/ABS (18%) | Talc | 10 | 5 | 3.92 | 60.24 | 60.94 | NB | — |
| 33 | PC | Mica (6 μm) | 10 | 5 | 4.94 | 71.79 | 22.92 | NB | — |
| 34 | PC/PBT (60/40) | Mica (6 μm) | 10 | 10 | 5.5 | 80.5 | 16.23 | NB | 6.12 |
| 35 | PC/PBT/MBS (40/35/10) | Mica (6 μm) | 7.5 | 7.5 | 3.94 | 64.01 | 43.11 | NB | — |
| 36 | PC/PBT/MBS (37/33.5/9.5) | Mica (6 μm) | 10 | 10 | 4.63 | 66.91 | 18.76 | NB | — |
| 37 | ABS | Mica (6 μm) | 10 | 15 | 4.32 | 57.84 | 11.26 | — | — |

ABS = acrylonitrile butadiene styrene copolymer;
BPADP = bisphenol A diphenylphosphate;
PBT = polybutylene terephthalate;
MBS = methyl methacrylate-butadiene-styrene copolymer.
$^a$ Araldite GT 6071/6095 (DGEBA Type Epoxy)
$^k$ measured over −40 to +80° C.

The above results show that excellent results may be obtained using a variety of polymer matrix systems.

Comparative Examples 38-40 and Examples 41 in accordance with the invention were prepared using the above procedure and ABS as a polymer matrix. Results are shown in Table 3 below.

TABLE 3

| Ex. No. | Resin | Filler Type | Filler (wt. %) | Fluoro-polymer (wt. %) | Tensile Modulus (GPa) | Yield Stress (Mpa) | Unnotched Impact Strength (KJ/m2) |
|---|---|---|---|---|---|---|---|
| 38 | ABS | — | — | — | 2.396 | 48.784 | 93.15 |
| 39 | ABS | — | — | 5% | 2.734 | 51.412 | 89.22 |
| 40 | ABS | — | — | 10 | 2.78 | 51.23 | 64.7 |
| 41 | ABS | Mica | 10 | 10 | 3.92 | — | — |

ABS = acrylonitrile butadiene styrene copolymer

The above results show that the methods of the present invention may be used with polymer systems such as ABS.

Examples 13, 14, 19, 21, 38, and 35 were further tested for flame retardancy in accordance with UL 94, and gloss in accordance with ASTM D 523. The gloss for the samples were measured using the. Results are shown in Table 4 below.

The above examples show the excellent flame retardancy and gloss may be obtained for the examples of the present invention.

TABLE 4

| Ex. No. | Resin | Filler Type | Filler (wt. %) | Fluoro-polymer (wt. %) | Flame Retardancy (UL Rating at 1.5 mm) | Flame Retardancy (UL Rating at 1.2 mm) | Gloss at 60° C. |
|---|---|---|---|---|---|---|---|
| 13 | PC | Carbon fiber$^c$ | 10 | 10 | — | — | 55 |
| 14 | PC | Carbon fiber$^c$ + mica$^i$ (55 μm) (1:1) | 10 | 10 | V0 | V0 | 40 |
| 19 | PC | Mica (6 μm) | 10 | 10 | V1 | V1 | 51 |
| 28 | PC/ABS (28%) | Mica (6 μm) | 10 | 10 | — | — | 55 |
| 31 | PC/BPADP (5%) | Mica (6 μm) | 10 | 10 | V0 | V0 | 53 |
| 35 | PC/PBT (60/40) | Mica (6 μm) | 10 | 10 | — | — | 44 |

BPADP = bisphenol A diphenylphosphate
$^c$ Fortafil 202
$^i$ Alsibronz 55

A set of Comparative Examples (C1-C16) was prepared in accordance with Table 5, using the procedure described above. Comparative Example 1 (C1) omits the filler and the fluoropolymer. C2-C11 omit the fluoropolymer. Comparative examples C12-C16 show the effects of omitting the filler. Results are shown in Table 5.

TABLE 5

| Ex. No. | Resin | Filler Type | Filler (wt. %) | Fluoro-polymer (wt. %) | Tensile Modulus (GPa) | Yield Stress (MPa) | Break Strain (%) | Unnotched Impact Strength (KJ/m$^2$) | CTE (×10$^{-5}$ m/m/° C.) |
|---|---|---|---|---|---|---|---|---|---|
| C1 | PC | — | 0 | 0 | 2.31 | 62.65 | 84.40 | NB | 8.04 |
| C2 | PC | Mica (55 μm) | 10 | 0 | 3.39 | 68.79 | 7.89 | 82.8 | — |
| C3 | PC | Talc | 10 | 0 | 3.49 | — | 6.88 | 11.3 | — |
| C4 | PC | Epoxysilane-coated talc | 10 | 0 | 2.75 | 65.64 | 12.51 | 116.7 | — |
| C5 | PC | Wollastonite$^f$ | 10 | 0 | 3.41 | | 0.38 | 12.5 | — |
| C6 | PC | Wollastonite$^f$ | 10 | 0 | 3.23 | 42.42 | 1.63 | 11.8 | — |
| C7 | PC | Silicon carbide (0.4 μm) | 10 | 0 | 2.95 | 66.18 | 17.73 | NB | — |
| C8 | PC | Silicon carbide (8 μm) | 10 | 0 | 2.96 | 67.08 | 28.97 | NB | — |
| C9 | PC | Silicon carbide (8 μm) | 15 | 0 | 3.14 | 68.71 | 14.35 | NB | — |
| C10 | PC | Mica (6 μm) | 10 | 0 | 3.88 | 69.48 | 31.57 | 178.1 | 5.46 |
| C11 | PC | Epoxy-coated mica (55 μm) | 10 | 0 | 3.36 | 66.39 | 15.28 | 194.51 | — |
| C11 | PC | Hydrous aluminosilicate$^a$ ( ) | 10 | 0 | 3.41 | 71.91 | 10.01 | 202.31 | — |
| C12 | PC | — | 0 | 5 | 2.74 | 64.13 | 77.52 | NB | — |
| C13 | PC | — | 0 | 10 | 3.12 | 31.91 | 61.16 | NB | 6.64 |
| C14 | PC | — | 0 | 15 | 3.56 | 33.84 | 49.78 | NB | — |
| C15 | PC | — | 0 | 20 | 4.83 | 73.85 | 10.79 | 211.61 | — |
| C16 | ABS | — | 0 | 15 | 3.12 | 51.39 | 18.63 | 240.7 | — |

$^a$ Engelhard-ASP NC
$^f$ NYCO 1

As may be seen from the above results, omission of filler and fluoropolymer (C1) results in a composition having significantly lower tensile modulus and higher CTE.

Polycarbonate (LEXAN® 105, from General Electric Co.) and PTFE in the amounts shown in Table 7 (wt. %, based on the total weight of the composition) were subjected to dry blending and then fed into a ZSK 25 co-rotating twin-screw extruder from WERNER and PFLEIDERER Co. The composition was melt mixed at a barrel temperature of about 275° C. The torque was maintained at 80 percent at a screw rotation rate of 300 rpm and then fed into a high-speed pelletizer, yielding a pelletized composition. The resulting pellets were dried for at least 4 hours at 80° C. before injection molding into ASTM/ISO test specimens on an L&T Demag De-Tech 60T LNC4-E injection molding machine operated at a temperature of about 280° C. Comparative examples C17 and C18 were prepared without filler. Results are shown in Table 6.

TABLE 6

| | C17 | C18 | Ex. 42 | Ex. 43 |
|---|---|---|---|---|
| Polycarbonate | 97.5 | 95 | 92.5 | 85 |
| Fluoropolymer | 2.5 | 5 | 2.5 | 5 |
| Filler (Mica) | — | — | 5 | 10 |
| Tensile Modulus (GPa) | 2.62 | 2.69 | 3.53 | 4.75 |

TABLE 6-continued

| | C17 | C18 | Ex. 42 | Ex. 43 |
|---|---|---|---|---|
| Yield Stress (MPa) | 58.70 | 58.66 | 63.14 | 68.85 |
| Yield Strain (%) | 6.04 | 5.98 | 5.20 | 4.44 |
| Break Stress (MPa) | 61.20 | 56.58 | 55.53 | 41.41 |
| Break Strain (%) | 82.44 | 74.00 | 67.42 | 37.53 |

Flame retardance testing was also conducted on comparative examples C19-C21 and Examples 44-48, each prepared and tested as described above, using the formulations shown in Table 8. "FOT" refers to the average flame out time of the sample.

TABLE 7

| | C19 | C20 | C21 | Ex. 44 | Ex. 45 | Ex. 46 | Ex. 47 | Ex. 48 |
|---|---|---|---|---|---|---|---|---|
| Polycarbonate | 67 | 57 | 57 | 54.5 | 52 | 47 | 62 | 57 |
| Bulk ABS | 8.11 | 8.11 | 8.11 | 8.11 | 8.11 | 8.11 | 8.11 | 8.11 |
| BPADP | 10 | 10 | 10 | 2.5 | 5 | 10 | 10 | 0 |
| PC-ST (20% Siloxane) | 15 | 15 | 15 | 15 | 15 | 15 | 0 | 15 |
| Filler (Mica) | — | 10 | — | 10 | 10 | 10 | 10 | 10 |
| Fluoropolymer | — | — | 10 | 10 | 10 | 10 | 10 | 10 |
| Tensile Modulus (GPa) | 2.65 | 4.48 | 3.33 | 4.6 | 5.07 | 4.96 | 5.6 | 4.19 |
| Elong. at break (%) | 88% | 12% | 11.8 | 6.24 | 5.43 | 4.45 | 3.25 | 6.85 |
| Flexural Modulus (GPa) | 2.3 | 3.9 | 2.59 | 3.8 | 3.9 | 4.2 | 4.8 | 3.5 |

TABLE 7-continued

|  | C19 | C20 | C21 | Ex. 44 | Ex. 45 | Ex. 46 | Ex. 47 | Ex. 48 |
|---|---|---|---|---|---|---|---|---|
| Flexural strength (Mpa) | 96.1 | 106.9 | 95.6 | 104.5 | 104.7 | 107.6 | 118.6 | 100.9 |
| Notched Izod Impact (KJ/m$^2$) | 64.4 | 8.9 | 15.3 | 10.1 | 10.6 | 9 | 7.7 | 12.3 |
| Flame performance, 1.5 mm | V-1 | V-0 | V-1 | V-1 | V-1 | V-0 | V-0 | — |
| 2nd Avg FOT | 5.6 | 3 | — | 7.6 | 5.2 | 3.8 | 2.3 | 18 |
| Flame performance, 1.2 mm | V-1 | V-1 | V-1 | V-1 | V-1 | V-1 | V-0 | — |
| 2nd Avg FOT | 8 | 7 | 12.6 | 12 | 9 | 6.2 | 3.2 | 19.6 |

The above results show that compositions may be formulated to provide good flame retardancy, even at lower loadings of flame retardants, together with a good combination of mechanical properties.

The following materials and methods were used in the following Examples Ex 49-Ex 63 and Comparative Examples CEx 22-CEx 28.

Materials

The following examples were based on the components set forth in Table 8.

TABLE 8

| NAME | DESCRIPTION, TRADE NAME | SOURCE |
|---|---|---|
| MBS-1 | Methacrylate-butadiene-styrene emulsion copolymer impact modifier with core-shell structure (CAS # 25053-09-2) | Rohm and Haas |
| Talc | Jetfine 3 C A talc (average particle size = 1.1 micron, CAS # 14807-96-6) | Luzenac |
| PBT-1 | Poly(1,4-butylene terephthalate), intrinsic viscosity of 0.66 dl/g as measured in a 60:40 wt. % phenol/tetrachloroethane mixture at 25° C. | Sabic Innovative Plastics |
| PBT-2 | Poly(1,4-butylene terephthalate), intrinsic viscosity of 1.2 dl/g as measured in 60:40 wt. % phenol/tetrachloroethane at 25° C. | Sabic Innovative Plastics |
| PC | PC bisphenol polycarbonate Lexan ® resin. Mn by GPC against polystyrene standards is 29 Kg/mol. | Sabic Innovative Plastics |
| TSAN | 50/50 wt. % poly(tetrafluoroethylene) blended with poly(styrene-co-acrylonitrile) (emulsion) | Sabic Innovative Plastics |
| MBS-2 | Methacrylate-butadiene-styrene emulsion copolymer with core-shell structure | Sabic Innovative Plastics |
| VHRG Resin | Acrylonitrile-butadiene-styrene copolymer | Sabic Innovative Plastics |

Methods

The components of the examples in the amounts shown in Tables 9-12 were extruded on an Entek 27 mm co-rotating twin-screw extruder. This extruder was fitted with 10-barrel sections and 5 feeders for introducing raw materials to the feed throat. Additional capabilities include downstream feeding capability that may be used for any material, including glass fibers and pigments. Typically the materials were fed to the extruder at a rate between 20 and 50 lbs per hour. The screw speed is typically adjusted to a value between 300 and 500 RPM. To minimize the specific energy and residence time of the material, the exact combination of feed rate and screw speed are selected to produce high feed rate and high torque. Materials were fed to this extruder using 5 K-Tron loss-in-weight auger feeders. Typically, only one raw material was fed on each feeder. The exception to this is additives and pigments, which were fed as a blend on a blend feeder. In the case where blends are made, a powdered blend carrier material containing mold release agents, antioxidants, colorants, quenchers, and UV stabilizers was chosen to dilute the additives The additives in the blend may be either solids or liquids, but care was taken to insure that blends of powders and pellets are not fed on a single feeder. Powders are known to segregate from pellets during feeding, leading to compositional variation and gradients on longer runs. The extrudate was cooled through a water bath prior to pelletizing. Test parts were injection molded on a van Dorn molding machine with a set temperature of approximately 240 to 265° C. The pellets were dried for 3-4 hours at 120° C. in a forced air-circulating oven prior to injection molding.

Multi-axial impact testing is based on the ASTM D3763 method. This test provides information on how a material behaves under multiaxial deformation conditions. The deformation applied is a high-speed puncture. Reported as the test results are impact energy, expressed in Joules (J). The final test result was calculated as the average of the test results of typically five test plaques.

The compositions were tested as described above and in the specification, and the results are set forth in Tables 9-12.

As shown in Table 9, the use of 1% (Ex. 50) and 2% (Ex. 51) of TSAN (50% fluoropolymer) improved both the flex modulus and Notched Izod impact strength at room temperature over Comparative Example 1. Use of higher amounts of TSAN (5%, Comparative Example 22) improved the flexural modulus, but worsened the Notched Izod impact strength at room temperature. Notched Izod impact strength may also be improved using more impact modifier, but modulus decreases to some extent (Comparative Examples 23 and 24 versus Example 49). Table 9 shows that amounts of fibrillated fluoropolymer ranging from 0.1 to less than 2.5 wt. % are critical.

TABLE 9

|  | Unit | Ex 49 | Ex 50 | Ex 51 | CEx 22 | CEx 23 | CEx 24 |
|---|---|---|---|---|---|---|---|
| Component |  |  |  |  |  |  |  |
| PBT-2 | parts | 20 | 20 | 20 | 20 | 20 | 20 |
| PBT-1 | parts | 10 | 10 | 10 | 10 | 10 | 10 |

TABLE 9-continued

|  | Unit | Ex 49 | Ex 50 | Ex 51 | CEx 22 | CEx 23 | CEx 24 |
|---|---|---|---|---|---|---|---|
| PC | parts | 52.35 | 52.35 | 52.35 | 52.35 | 52.35 | 52.35 |
| MBS-1 | parts | 8 | 8 | 8 | 8 | 12 | 15 |
| TSAN | parts |  | 1 | 2 | 5 | — | — |
| Talc | parts | 8 | 8 | 8 | 8 | 8 | 8 |
| Additives | parts | 1.65 | 1.55 | 1.55 | 1.55 | 1.55 | 1.55 |
| Total | parts | 100 | 101 | 102 | 105 | 104 | 107 |
| Properties |  |  |  |  |  |  |  |
| Flexural Modulus | Mpa | 2760 | 3510 | 3500 | 3140 | 2650 | 2590 |
| Notched Izod impact strength at 23° C. | J/m | 404 | 653 | 741 | 243 | 512 | 533 |
| Notched Izod impact strength at 0° C. | J/m | 173 | 174 | 228 | 106 | 389 | 457 |
| Multiaxial impact total energy at 22° C. | J | 60 | 64 | 64 | 62 | 53 | 57 |
| Multiaxial impact total energy at 0° C. | J | 64 | 67 | 70 | 66 | 61 | 59 |
| Multiaxial impact total energy at −20° C. | J | 66 | 71 | 65 | 64 | 60 | 62 |
| HDT at 0.455 Mpa | ° C. | 120 | 123 | 125 | 123 | 121 | 120 |
| Vicat B/50, max 150° C. | ° C. | 131 | 127 | 132 | 127 | 131 | 130 |
| MVR (250° C., 5 kg, 360 sec) | cm³/10 min | 19 | 12 | 12 | 4 | 16 | 13 |

As shown in Table 10, the use of a specific amount of TSAN may improve impact performance without substantially adversely affecting the modulus. The use of 1% and 2% TSAN in Examples 52 and 53 provided compositions with slightly improved modulus and much improved Notched Izod impact strength at room temperature. The same was observed in Examples 55 and 56 versus Example 54 where no TSAN was used.

The Example in Table 11 showed that significant improvement in Notched Izod impact strength may still be observed using 2% TSAN at equivalent level of mineral filler (20 wt. %). This benefit dropped significantly when about 25% of the mineral filler was used (Example 60 versus example 59).

TABLE 10

|  | Unit | CEx 25 | Ex 52 | Ex 53 | Ex 54 | Ex 55 | Ex 56 |
|---|---|---|---|---|---|---|---|
| Component |  |  |  |  |  |  |  |
| PBT-2 | parts | 22 | 22 | 22 | 22.5 | 22.5 | 22.5 |
| PBT-1 | parts | 12 | 12 | 12 | 12.9 | 12.9 | 12.9 |
| PC | parts | 44 | 44 | 43 | 46 | 46 | 46 |
| MBS-2 | parts | 10 | 10 | 10 | 10 | 10 | 10 |
| TSAN | parts |  | 1 | 2 |  | 0.5 | 1 |
| Talc | parts | 10 | 10 | 10 | 7 | 7 | 7 |
| Additives | parts | 2 | 2 | 2 | 1.6 | 1.6 | 1.6 |
| Total | parts | 100 | 101 | 102 | 100 | 100.5 | 101 |
| Properties |  |  |  |  |  |  |  |
| Flexural Modulus | Mpa | 2930 | 3170 | 3170 | 2750 | 2780 | 2880 |
| Notched Izod impact strength at 23° C. | J/m | 275 | 521 | 619 | 524 | 665 | 723 |
| Notched Izod impact strength at 0° C. | J/m | 158 | 179 | 205 | 175 | 517 | 578 |
| Multiaxial impact total energy at 22° C. | J | 54 | 59 | 60 | 57 | 62 | 61 |
| Multiaxial impact total energy at 0° C. | J | 56 | 62 | 65 | 68 | 66 | 65 |
| Multiaxial impact total energy at −20° C. | J | 39 | 62 | 65 | 69 | 69 | 72 |
| HDT at 0.455 MPa | ° C. | 120 | 122 | 121 | 115 | 117 | 116 |
| Vicat B/50, max 150° C. | ° C. | 133 | 134 | 133 | — | — | 131 |
| MVR (250° C., 5 kg, 360 s) | cm³/10 min | 11 | 7 | 5 | 10 | 12 | 11 |

TABLE 11

|  | Unit | Ex 57 | Ex 58 | Ex 59 | Ex 60 |
|---|---|---|---|---|---|
| Component |  |  |  |  |  |
| PBT-2 | parts | 14.8 | 14.8 | 14.8 | 14.8 |
| PBT-1 | parts | 6.9 | 6.9 | 6.9 | 6.9 |
| PC | parts | 46.9 | 46.9 | 41.9 | 41.9 |
| MBS-1 | parts | 9.9 | 9.9 | 9.9 | 9.9 |
| TSAN | parts |  | 2 |  | 2 |
| Talc | parts | 19.8 | 19.8 | 24.8 | 24.8 |
| Additives | parts | 1.7 | 1.7 | 1.7 | 1.7 |
| Total | parts | 100 | 102 | 100 | 102 |
| Properties |  |  |  |  |  |
| Flexural Modulus | Mpa | 4000 | 4220 | 4580 | 4890 |
| Notched Izod impact strength at 23° C. | J/m | 159 | 514 | 107 | 167 |
| Notched Izod impact strength at 0° C. | J/m | 99 | 132 | 82 | 98 |
| Multiaxial impact total energy at 22° C. | J | 51 | 55 | 39 | 48 |
| Multiaxial impact total energy at 0° C. | J | 49 | 58 | 19 | 33 |
| Multiaxial impact total energy at −20° C. | J | 34 | 52 | 11 | 27 |
| HDT at 0.455 MPa | ° C. | 122 | 124 | 124 | 126 |
| Vicat B/50, max 150° C. | ° C. | 129 | 129 | 131 | 132 |
| MVR (250° C., 5 kg, 360 sec) | cm³/10 min | 12 | 5 | 11 | 3 |

The data in Table 12 show that similar effect was observed when ABS was used as the impact modifier. Examples 62 and 63 (1% and 2% TSAN) showed much better Notched Izod impact strength at equivalent modulus level. With 5% TSAN, however, the impact benefit was lost (Comparative Examples 26 vs Example 61). The use of more ABS may gradually increase the Notched Izod impact strength, with the expected modulus tradeoff (Comparative Examples 27 and 28 versus Example 61).

TABLE 12

|  | Unit | Ex 61 | Ex 62 | Ex 163 | CEx 26 | CEx 27 | CEx 28 |
|---|---|---|---|---|---|---|---|
| Component |  |  |  |  |  |  |  |
| PBT-1 | parts | 30 | 30 | 30 | 30 | 30 | 30 |
| PC | parts | 52.4 | 52.4 | 52.4 | 52.4 | 52.4 | 52.4 |
| VHRG resin | parts | 8 | 8 | 8 | 8 | 12 | 15 |
| TSAN | parts |  | 1 | 2 | 5 |  |  |
| talc | parts | 8 | 8 | 8 | 8 | 8 | 8 |
| Additives | parts | 1.6 | 1.6 | 1.6 | 1.6 | 1.6 | 1.6 |
| Total | parts | 100 | 101 | 102 | 105 | 104 | 107 |
| Properties |  |  |  |  |  |  |  |
| Flexural Modulus | Mpa | 2920 | 3060 | 3050 | 3160 | 2880 | 2750 |
| Notched Izod impact strength at 23° C. | J/m | 263 | 628 | 653 | 160 | 285 | 402 |
| Notched Izod impact strength at 0° C. | J/m | 132 | 167 | 159 | 83 | 147 | 162 |
| Multiaxial impact total energy at 22° C. | J | 53 | 62 | 60 | 60 | 52 | 50 |
| Multiaxial impact total energy at 0° C. | J | 58 | 66 | 65 | 59 | 57 | 54 |
| Multiaxial impact total energy at −20° C. | J | 54 | 68 | 57 | 57 | 46 | 54 |
| HDT at 0.455 Mpa | ° C. | 115 | 118 | 118 | 118 | 110 | 111 |
| Vicat B/50, max 150° C. | ° C. | 126 | 126 | 126 | 122 | 124 | 121 |
| MVR (250° C., 5 kg, 360 sec) | cm³/10 min | 28 | 20 | 12 | 5 | 24 | 21 |

All patents and published articles cited herein are incorporated herein by reference.

While the invention has been illustrated and described in typical embodiments, it is not intended to be limited to the details shown, since various modifications and substitutions may be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A composition comprising, based on the total weight of the composition:

from 10 to 80 wt. % of a polyester comprising units of the formula

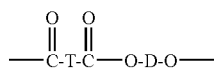

wherein T is a divalent group selected from the group consisting of $C_{5-7}$ cycloaliphatics groups, $C_{6-12}$ aromatic groups, and combinations thereof, and D is a divalent group selected from the group consisting of $C_{6-12}$ cycloaliphatic groups, $C_{2-12}$ aliphatic groups, and combinations thereof;

from 10 to 80 wt. % of a polycarbonate;

from 0 to 20 wt. % of an impact modifier;

from 2 to less than 25 wt. % of a reinforcing filler;

from 0.1 to less than 2.5 wt. % of a fibrillated fluoropolymer;

from 0 to 5 wt. % of an additive selected from the group consisting of antioxidants, mold release agents, colorants, quenchers, stabilizers, and combinations thereof;

wherein the composition has a heat deflection temperature of at least 110° C., measured in accordance with to ASTM D648 on 3.2 mm thick molded bars at 0.455 MPa;

wherein the composition exhibits an improved Notched Izod impact strength that is at least 20% more than the Notched Izod impact strength of an identical composition without the fibrillated fluoropolymer, wherein the Notched Izod impact strength is measured in accordance with ASTM D256 at 23° C. on 3.2 mm thick bars; and the composition has a flexural modulus that is higher or within 5% of the flexural modulus of an identical composition without the fibrillated fluoropolymer, wherein flexural modulus is measured in accordance with ASTM D790 at 23° C.

2. The composition of claim 1, wherein the composition exhibits an improved Notched Izod impact strength that is at least a 40% more than the Notched Izod impact strength of an identical composition without the fibrillated fluoropolymer; wherein the notched Izod impact strength is measured in accordance with ASTM D256 on 3.2 mm thick bars at 23° C.

3. The composition of claim 1, wherein
the composition exhibits an improved Notched Izod impact strength that is at least a 100% more than the Notched Izod impact strength of an identical composition without the fibrillated fluoropolymer, wherein the notched Izod impact strength is measured in accordance with ASTM D256 at 23° C.

4. The composition of claim 1, wherein T is selected from the group consisting of cyclohexylene, terephthalylene, isophthalylene, or a combination thereof, and D is selected from the group consisting of 1,4-cyclohexanedimethylene, ethylene, 1,2-propylene, 1,3-propylene, 1,4-butylene, and a combination thereof.

5. The composition of claim 1, wherein the polyester is poly(butylene terephthalate).

6. The composition of claim 5, wherein the composition does not contain a polyester that meets the conditions wherein T is selected from the group consisting of cyclohexylene, terephthalylene, isophthalylene, and a combination thereof, and wherein D is selected from the group consisting of 1,4-cyclohexanedimethylene, ethylene, 1,2-propylene, 1,3-propylene, and a combination thereof.

7. The composition of claim 1, wherein the polyester is poly(ethylene terephthalate).

8. The composition of claim 7, wherein the composition does not contain a polyester that meets the conditions wherein T is selected from the group consisting of cyclohexylene, terephthalylene, isophthalylene, or a combination thereof, and D is selected from the group consisting of 1,4-cyclohexanedimethylene, ethylene, 1,2-propylene, 1,3-propylene, or a combination thereof.

9. The composition of claim 1, further comprising a second polyester that is different from the polyester.

10. The composition of claim 1, wherein the polycarbonate comprises units derived from bisphenol A.

11. The composition of claim 1, wherein the impact modifier is a core-shell polymer selected from the group consisting of methyl (meth)acrylate-butadiene-styrenes, acrylonitrile-styrene-acrylates, acrylonitrile-butadiene-styrenes, butyl acrylates, ethyl acrylates, and combinations thereof.

12. The composition of claim 11, wherein the impact modifier is a high rubber graft.

13. The composition of claim 1, wherein the impact modifier is an acrylonitrile butadiene styrene.

14. The composition of claim 1, wherein the impact modifier is a methyl methacrylate-butadiene-styrene.

15. The composition of claim 1, wherein the reinforcing filler is selected from the group consisting of calcium carbonate, mica, kaolin, talc, glass fibers, carbon fibers, magnesium carbonate, sulfates of barium, calcium sulfate, titanium, nanoclay, silica, hydroxides of aluminum or ammonium or magnesium, zirconia, nanoscale titania, and a combination thereof.

16. The composition of claim 15, wherein the filler is a talc having an average particle size of 0.3 to 3 micrometers.

17. The composition of claim 1, wherein the fluoropolymer is encapsulated by an encapsulating polymer selected from the group consisting of styrene-acrylonitrile copolymers, acrylonitrile-butadiene-styrene copolymers, alpha-alkyl-styrene-acrylonitrile copolymers, methyl methacrylates, alpha-methylstyrene-acrylonitrile copolymers, styrene-butadiene rubbers, and combinations thereof.

18. The composition of claim 1, wherein the fluoropolymer comprises styrene-acrylonitrile encapsulated poly(tetrafluoroethylene).

19. A composition comprising:
from 20 to 70 wt. % of a poly(butylene terephthalate);
from 15 to 70 wt. % of a polycarbonate comprising carbonate units derived from bisphenol-A;
from 3 to 15 wt. % of an impact modifier selected from the group consisting of acrylonitrile-butadiene-styrene, methyl methacrylate-butadiene-styrene, and combinations thereof;
from 2 to 20 wt. % of a talc;
from 0.2 to less than 2.5 wt. % of styrene-acrylonitrile encapsulated poly(tetrafluoroethylene)); and
from 0 to 5 wt. % of an additive selected from the group consisting of antioxidants, mold release agents, colorants, quenchers, stabilizers, and combinations thereof
wherein the composition exhibits an improved Notched Izod impact strength that is at least 20% more than the Notched Izod impact strength of an identical composition without the fibrillated fluoropolymer, wherein the Notched Izod impact strength is measured in accordance with ASTM D256 at 23° C. on 3.2 mm thick bars; and
the composition has a flexural modulus that is higher or within 5% of the flexural modulus of an identical composition without the fibrillated fluoropolymer, wherein flexural modulus is measured in accordance with ASTM D790 at 23° C.

20. The composition of claim 19, wherein the composition consists essentially of the poly(butylene terephthalate), the polycarbonate, the impact modifier, the talc, the additive, and the poly(tetrafluoroethylene).

21. A composition comprising:
from 20 to 50 wt. % of a polybutylene terephthalate;
from 40 to 60 wt. % of a bisphenol-A polycarbonate;
from 3 to 15 wt. % of a core-shell methyl methacrylate-butadiene-styrene impact modifier;
from 2 to 15 wt. % of a talc having an average particle size of 0.5 to 2 micrometers;
from 1 to 2 wt. % of styrene-acrylonitrile encapsulated poly(tetrafluoroethylene); and
from 0 to 4 wt. % of an additive composition selected from the group consisting of antioxidants, mold release agents, colorants, quenchers, stabilizers, and combinations thereof;
wherein the composition exhibits an improved Notched Izod impact strength that is at least 20% more than the Notched Izod impact strength of an identical composition without the fibrillated fluoropolymer, wherein the Notched Izod impact strength is measured in accordance with ASTM D256 at 23° C. on 3.2 mm thick bars; and
the composition has a flexural modulus that is higher or within 5% of the flexural modulus of an identical composition without the fibrillated fluoropolymer, wherein flexural modulus is measured in accordance with ASTM D790 at 23° C.

22. The composition of claim 21, wherein the composition consists essentially of the polybutylene terephthalate, the polycarbonate, the impact modifier, the talc, the additive, and the poly(tetrafluoroethylene).

23. A method of forming a composition comprising melt blending the components of the composition of claim 1.

24. The method of making an article, comprising melt blending the components of the composition of claim 1, and further comprising shaping by injection molding, extrusion molding, rotation molding, foam molding, calendar molding, blow molding, thermoforming, compaction, or melt spinning the melt blended composition to form the article.

25. An article comprising the composition of claim 1.

26. The article of claim 25, wherein the article is a power tool housing.

* * * * *